(12) United States Patent
Rader et al.

(10) Patent No.: US 9,123,204 B2
(45) Date of Patent: Sep. 1, 2015

(54) SECURE SMART CARD OPERATIONS

(75) Inventors: Richard Rader, Albany, OR (US); Erik B. Petersen, Corvallis, OR (US); Robert P. Bartholomew, Corvallis, OR (US); Marc Espin, Sparks, NV (US); William R. Cunningham, II, Reno, NV (US); Scott J. MacMillan, Reno, NV (US)

(73) Assignee: IGT, Las Vegas, NV (US)

( * ) Notice: Subject to any disclaimer, the term of this patent is extended or adjusted under 35 U.S.C. 154(b) by 464 days.

(21) Appl. No.: 12/756,396

(22) Filed: Apr. 8, 2010

(65) Prior Publication Data

US 2010/0197383 A1 Aug. 5, 2010

Related U.S. Application Data

(63) Continuation-in-part of application No. 11/967,916, filed on Dec. 31, 2007.

(60) Provisional application No. 60/904,017, filed on Feb. 27, 2007.

(51) Int. Cl.
*G06Q 99/00* (2006.01)
*G07F 17/32* (2006.01)
(Continued)

(52) U.S. Cl.
CPC .......... *G07F 17/3251* (2013.01); *G06F 21/105* (2013.01); *G06F 21/34* (2013.01);
(Continued)

(58) Field of Classification Search
CPC .................. G07F 17/3251; G06Q 2220/10
USPC .............................................. 705/51; 463/25
See application file for complete search history.

(56) References Cited

U.S. PATENT DOCUMENTS 5,811,772 A 9/1998 Lucero
5,902,983 A 5/1999 Crevelt
(Continued)

FOREIGN PATENT DOCUMENTS

WO WO 00/62214 10/2000
WO WO 00/67177 11/2000
(Continued)

OTHER PUBLICATIONS

International Search Report and Written Opinion dated Jan. 21, 2009 issued in Application No. PCT/US2008/052939, 10 pages.
(Continued)

*Primary Examiner* — James D Nigh
(74) *Attorney, Agent, or Firm* — Neal, Gerber & Eisenberg LLP

(57) ABSTRACT

Various embodiments described or referenced herein are directed to different devices, methods, systems, and computer program products for facilitating cashless digital transactions (e.g., in a casino environment). A wager-based gaming machine may include a memory device capable of storing a first credit balance representing an amount of credit available for wagering. The wager-based gaming machine may include a communication interface configured to communicate with a portable electronic device capable of storing a second credit balance representing a second amount of credit available on the portable electronic device. The wager-based gaming machine may include a secure transaction device. The secure transaction device may be operable to transmit to the portable electronic device a request to update the second credit balance, the request including security authorization information. The secure transaction device may also be operable to receive from the portable electronic device an indication that the second amount of credit has been updated in accordance with the request, when it is determined that the security authorization information complies with one or more security authorization requirements. The secure transaction device may also be operable to update the first credit balance stored in the first memory device in accordance with the request.

19 Claims, 16 Drawing Sheets

(51) Int. Cl.
*G06F 21/10* (2013.01)
*G06F 21/34* (2013.01)

(52) U.S. Cl.
CPC ........... *G07F 17/32* (2013.01); *G07F 17/3241* (2013.01); *G07F 17/3281* (2013.01); *G06F 2221/2109* (2013.01); *G06Q 2220/10* (2013.01)

(56) References Cited

U.S. PATENT DOCUMENTS

| | | | |
|---|---|---|---|
| 6,149,522 | A | 11/2000 | Alcorn et al. |
| 6,264,561 | B1 | 7/2001 | Saffari et al. |
| 6,402,026 | B1 * | 6/2002 | Schwier ........................ 235/379 |
| 6,527,638 | B1 | 3/2003 | Walker et al. |
| 6,577,733 | B1 * | 6/2003 | Charrin ........................ 380/251 |
| 6,645,077 | B2 | 11/2003 | Rowe |
| 6,682,421 | B1 | 1/2004 | Rowe et al. |
| 6,685,567 | B2 | 2/2004 | Cockerille et al. |
| 6,804,763 | B1 | 10/2004 | Stockdale et al. |
| 6,852,031 | B1 | 2/2005 | Rowe |
| 7,111,141 | B2 | 9/2006 | Nelson |
| 7,152,783 | B2 * | 12/2006 | Charrin ........................ 235/379 |
| 7,384,339 | B2 | 6/2008 | LeMay et al. |
| 7,419,428 | B2 | 9/2008 | Rowe |
| 7,515,718 | B2 | 4/2009 | Nguyen et al. |
| 7,650,389 | B2 | 1/2010 | Mohanty |
| 7,690,043 | B2 | 3/2010 | Saunders et al. |
| 7,765,162 | B2 * | 7/2010 | Binder et al. ................... 705/66 |
| 7,780,526 | B2 | 8/2010 | Nguyen et al. |
| 7,819,742 | B2 | 10/2010 | Chamberlain et al. |
| 7,997,981 | B2 | 8/2011 | Rowe et al. |
| 8,055,910 | B2 * | 11/2011 | Kocher et al. ................. 713/193 |
| 8,172,671 | B2 | 5/2012 | Walker et al. |
| 2002/0077178 | A1 | 6/2002 | Oberberger et al. |
| 2002/0145051 | A1 | 10/2002 | Charrin et al. |
| 2003/0014370 | A1 * | 1/2003 | Charrin ........................ 705/65 |
| 2003/0145086 | A1 * | 7/2003 | O'Reilly ....................... 709/226 |
| 2003/0171145 | A1 * | 9/2003 | Rowe ............................ 463/25 |
| 2004/0087360 | A1 | 5/2004 | Chamberlain et al. |
| 2004/0127277 | A1 | 7/2004 | Walker et al. |
| 2004/0199769 | A1 * | 10/2004 | Proudler ....................... 713/169 |
| 2004/0230535 | A1 * | 11/2004 | Binder et al. ................... 705/64 |
| 2005/0192099 | A1 | 9/2005 | Nguyen et al. |
| 2005/0193209 | A1 | 9/2005 | Saunders et al. |
| 2005/0266919 | A1 | 12/2005 | Rowe et al. |
| 2006/0025207 | A1 | 2/2006 | Walker et al. |
| 2006/0160614 | A1 * | 7/2006 | Walker et al. ................... 463/29 |
| 2006/0258427 | A1 | 11/2006 | Rowe et al. |
| 2007/0004510 | A1 | 1/2007 | Underdahl et al. |
| 2007/0033419 | A1 * | 2/2007 | Kocher et al. ................. 713/193 |
| 2007/0060394 | A1 | 3/2007 | Gowin et al. |
| 2007/0117623 | A1 | 5/2007 | Nelson et al. |
| 2007/0243925 | A1 | 10/2007 | LeMay et al. |
| 2007/0298873 | A1 | 12/2007 | Nguyen et al. |
| 2008/0045330 | A1 * | 2/2008 | Chim ............................ 463/25 |
| 2008/0113772 | A1 | 5/2008 | Burrill et al. |
| 2008/0188308 | A1 | 8/2008 | Shepherd et al. |
| 2008/0207307 | A1 | 8/2008 | Cunningham, II et al. |
| 2009/0069090 | A1 | 3/2009 | Moser et al. |
| 2009/0265105 | A1 | 10/2009 | Davis et al. |
| 2011/0022838 | A1 * | 1/2011 | Shaikh ......................... 713/156 |

FOREIGN PATENT DOCUMENTS

| | | |
|---|---|---|
| WO | WO-01/48580 A2 | 7/2001 |
| WO | WO 01/84516 | 11/2001 |
| WO | WO 2005/028046 | 3/2005 |
| WO | WO 2007/143537 | 12/2007 |
| WO | WO 2008/016952 | 2/2008 |

OTHER PUBLICATIONS

Australian Office Action dated Feb. 7, 2012 issued in AU2008219557.
International Search Report dated Jun. 10, 2011 issued in Application No. PCT/US2011/030894.
Office Action dated Jul. 5, 2012 issued in U.S. Appl. No. 11/967,916.
Office Action dated Oct. 10, 2012 issued in U.S. Appl. No. 13/230,502.
Notice of Allowance dated Nov. 9, 2012 issued in U.S. Appl. No. 11/967,916.
Singapore Office Action dated May 4, 2012 in SG Application No. 201106938-2.
Dai et al., "Off-line micro-payment system for content sharing in P2P networks", G. Chakraborty (Ed.): ICDCIT 2005, LNCS 3816, pp. 297-307, Springer-Verlag Berlin Heidelberg, 2005, 11 pages.

* cited by examiner

SECURE SMART CARD OPERATIONS

PRIORITY AND RELATED APPLICATION DATA

This application is a continuation-in-part of and claims priority to co-pending and commonly assigned U.S. patent application Ser. No. 11/967,916, filed on Dec. 31, 2007, entitled "METHODS AND ARCHITECTURE FOR CASHLESS SYSTEM SECURITY," by Cunningham et al., which claims priority to U.S. Provisional Patent Application No. 60/904,017, filed on Feb. 27, 2007, entitled "METHODS AND ARCHITECTURE FOR CASHLESS SYSTEM SECURITY," by Cunningham et al., both of which are incorporated herein by reference in their entirety and for all purposes.

TECHNICAL FIELD

The present invention relates generally to gaming devices and systems, and more specifically to security methods for gaming devices.

BACKGROUND OF THE INVENTION

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by IGT of Reno, Nev. Award ticket systems and systems using other cashless mediums, such as smart cards, are referred to as cashless systems.

Cashless systems, such as the EZ pay ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

A concern in any cashless system is security. Typically, cashless instruments store a cash value that is ultimately redeemable for cash. Unfortunately, cashless instruments, such as printed tickets or smart cards, can be vulnerable to fraud in some instances, particularly where such instruments or systems of instruments are used in relatively simple formats or security architectures. A gaming entity, such as casino, that issues the cashless instrument can be liable for any cash that is obtained using the cashless instrument whether the cashless instrument is used in a valid or a fraudulent manner. While existing systems and methods for providing cashless instruments associated with gaming devices and gaming systems have been adequate in the past, improvements are usually welcomed and encouraged that reduce the potential and/or limit damages resulting from fraud. In light of the foregoing, it is thus desirable to develop methods and systems for preventing or reducing fraud and other potential problems associated with cashless instruments.

Conventional smart cards used for cashless gaming often employ the Gemplus file format model of storing and capturing information. The Gemplus format permits a credit balance, along with other information, to be stored on a Gemplus card. Credit can be deducted from a Gemplus card for use in gaming or for small transactions, such as with merchants who are not connected with a credit card network. If a Gemplus card is stolen, only money that is stored on the Gemplus card will be lost.

An application running on a device communicating with a Gemplus card is used to update and retrieve data from the Gemplus card. For example, the application may be running on a card reader or a device in communication with the card reader. Updating values stored on a Gemplus card may be accomplished using symmetric key encryption (e.g., 3DES). The Gemplus card updates the credit balance stored on the Gemplus card if the request is encrypted with the appropriate cryptographic key. However, if any applications were permitted to add to a balance stored on the card, then a user possessing such a key would be able to add value to a card without paying. Thus, in the Gemplus system, different symmetric keys are used for the debiting and crediting functions. In this way, many systems have the ability to retransfer credit from Gemplus cards, while the ability to add credit to Gemplus cards is limited to trusted parties.

These conventional techniques suffer from several drawbacks. For example, if a cryptographic key for updating credit balances on a Gemplus card is discovered by an attacker, then all Gemplus cards that use that cryptographic key are compromised, since the cryptosystem is symmetric. As another example, a Gemplus card verifies that a request to update a value is encrypted with the correct key, but not whether the requester is authorized to make the request. As yet another example, communication with Gemplus cards is susceptible to interception and alteration (e.g., at the card read/write interface of the card reader). Due to these and other weaknesses, hackers have been able to cheat the Gemplus system for profit.

In addition, the limited capabilities of the Gemplus system make it unsuitable for cashless gaming. For example, the Gemplus format provides only three bytes of memory for storing credit. Thus, a Gemplus card may be used for small purchases or low-credit gaming, but it may have insufficient memory for storing larger amounts of credit. As another example, the limitations on adding credit to a Gemplus card mean that a player may not be able to use a Gemplus card to cash out a gaming machine after a gaming session. That is, the credit value stored on the gaming machine may not be moved to the Gemplus card. As yet another example, the Gemplus system uses proprietary hardware for Gemplus cards that is only available from licensed suppliers, thus resulting in increased cost for each card.

Thus, a need exists for cashless gaming techniques having expanded capabilities and greater security.

SUMMARY OF THE INVENTION

Various embodiments described or referenced herein are directed to different devices, methods, systems, and computer program products for facilitating cashless digital transactions. In some embodiments, devices, methods, systems, and computer program products may be configured or designed for use in a casino environment.

According to various embodiments, a wager-based gaming machine may include a master gaming controller configured to control one or more games of chance; a wager input device operable to receive an indication of a wager to play the one or more games of chance; a value output device configured to output an indication of value including an award based on play of the one or more games of chance; a first memory device capable of storing a first credit balance representing a first amount of credit available for wagering to play the one or more games of chance; and/or a communication interface configured to communicate with a portable electronic device having a first processor and a second memory device, the second memory device capable of storing a second credit balance representing a second amount of credit available on the portable electronic device. A wager-based gaming machine may also include a secure transaction device comprising a second processor and a third memory device, the processor operable to transmit to the portable electronic device, via the communication interface, a first request to update the second credit balance, the first request including security authorization information; receive from the portable electronic device, via the communication interface, when it is determined that the security authorization information complies with one or more security authorization requirements, an indication that the second amount of credit has been updated in accordance with the request; and update the first credit balance stored in the first memory device in accordance with the request.

In at least one embodiment, a method of operating a wager-based gaming machine may include storing, in a first memory device on the gaming machine, a first credit balance representing a first amount of credit available for wagering to play the one or more games of chance available on the gaming machine; transmitting from a secure transaction device on the gaming machine, via a communication interface, a first request to a portable electronic device in communication with the gaming machine, the first request representing a request to update a second credit balance stored on the portable electronic device, the second credit balance representing a second amount of credit available on the portable electronic device, the first request including security authorization information; receiving from the portable electronic device, via the communication interface, when it is determined that the security authorization information complies with one or more security authorization requirements, an indication that the first amount of credit has been updated in accordance with the request; and/or updating the first credit balance stored in the first memory device in accordance with the request.

In one or more embodiments, a request (e.g., the first request) may include a request to transfer a designated credit amount from the portable electronic device to the gaming machine and/or a request to transfer a designated credit amount from the gaming machine to the portable electronic device. In one or more embodiments, a request (e.g., the first request) may be transmitted responsive to a determination that the first credit balance has reached a first credit threshold and/or responsive to a request received from a user of the gaming machine. In some embodiments, the second processor of the secure transaction device may be operable to determine (e.g., using a predetermined auto-transfer amount and the first credit threshold) the designated credit amount.

In one or more embodiments, a processor at the secure transaction device (e.g., the second processor) may be operable to determine, in response to a request to cash out, whether the communication interface is in communication with the portable electronic device; transfer, in response to a determination that the communication interface is not in communication with the portable electronic device, the first credit balance from the first memory device to the third memory device; transmit a request to the master gaming controller, the request indicating that the gaming machine should be placed in the out-of-service state; and/or transmit a request to perform a no-card-cash-out operation.

In one or more embodiments, a processor at the secure transaction device (e.g., the second processor) may be operable to determine a first offline window for the portable electronic device, the first offline window representing a time period in which the portable electronic device may be used for cashless gaming without authenticating with one or more cashless gaming servers; determine a first on-line use of the portable electronic device, the first on-line use corresponding to a most recent time in which the portable electronic device was authenticated with the one or more cashless gaming servers; determine, using the first offline window and the first offline use, whether the first offline use is within the first offline window; and/or permit, when the first offline use is within the first offline window, use of the portable electronic device without the portable electronic device authenticating with the one or more cashless gaming servers.

In one or more embodiments, a processor at the secure transaction device (e.g., the second processor) may be operable to receive from the portable electronic device, via the communication interface, identification information associated with the portable electronic device; transmit, to a cashless gaming server, a first message including the received identification information; receive, from the cashless gaming server, a second message including an indication that further use of the portable electronic device has been at least partially blocked; and/or output a notification that further use of the portable electronic device has been blocked.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DETAILED DESCRIPTION

Figure 1:
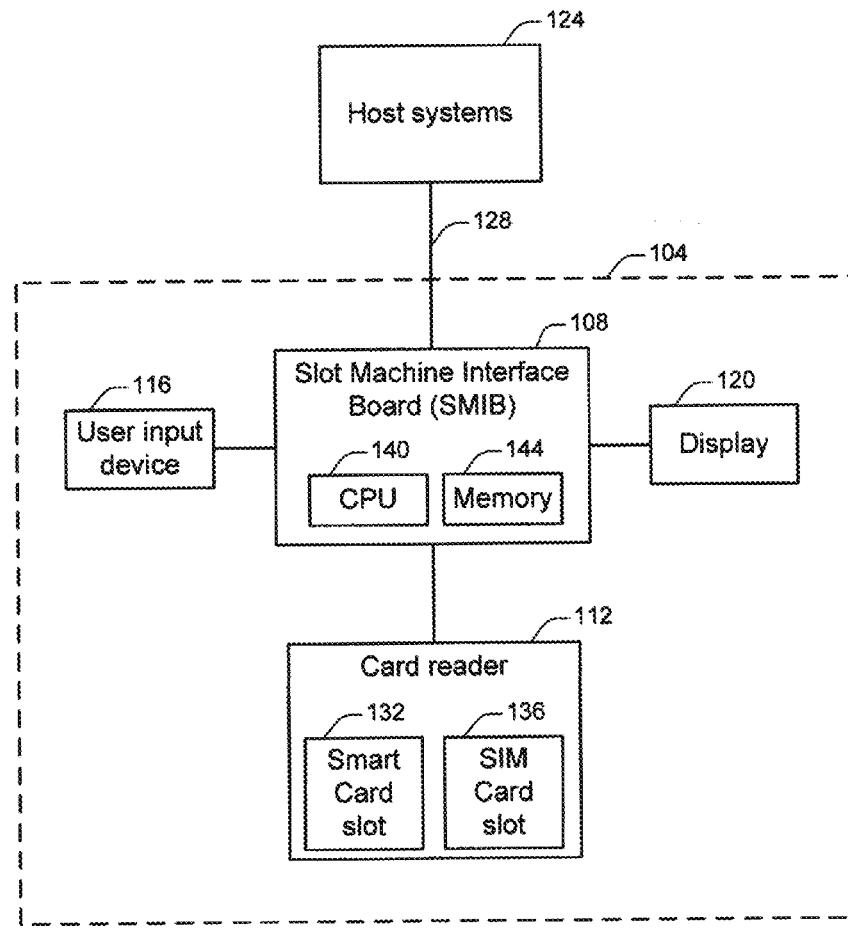
FIG. 1 shows a block diagram 100 illustrating a system for performing smart card initialization and utilization, constructed in accordance with one embodiment of the present invention.

Exemplary applications of systems and methods according to the present invention are described in this section. These examples are being provided solely to add context and aid in the understanding of the present invention. It will thus be apparent to one skilled in the art that the invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, method and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of gaming devices, such as bill/ticket validators, printers, mechanical displays, video displays, coin hoppers, light panels, input buttons, touch screens, key pads, card readers, audio output devices, etc., may be coupled to the gaming machine. The gaming devices may be controlled by a master gaming controller executing authenticated software to provide a gaming interface for a game play experience on the gaming machine.

In one or more embodiments of the present disclosure, a smart card includes one or more programs (e.g., Java applets), which may allow both flexibility and control over the functions of the card as well as the information stored thereon. According to conventional techniques (e.g., in the Gemplus model), a credit balance is a stored value on the smart card, and an external system, such as a card reader, determines whether to alter the stored balance values to complete a transaction. A Gemplus card may determine whether a request to alter a stored balance is properly encrypted, but it does not determine whether the requester has authorization to make such a request. In contrast, one or more embodiments of the present disclosure include a smart card with a program residing on the card itself (e.g., a Java applet) that may verify authorization to perform the transactions. Thus, in one or more embodiments, an external system requests the card itself to perform a transaction, and only the program on the smart card is permitted to alter the stored credit balance value.

In one or more embodiments, running a verification application on the card itself instead of a different device eliminates the weak link in the security, described above. One reason for the increased security is that when using conventional techniques (e.g., the Gemplus model), it may be possible to physically intercept communications passing between the card and the system operating on data stored on the card. This interception often occurs at the card read/write interface of the card reader. However, when embodiments disclosed herein are implemented, the operations of an application reading and/or updating the stored data often cannot be observed, and communications between the application and the data cannot be intercepted, because the application that operates on the data may be embedded within the card itself.

Another reason for the increased security is that in one or more embodiments, the smart card itself verifies whether a requester has permission to make a request to perform a transaction, and those transactions may later be verified before allowing credit stored on the card to be given to a user as cash. This chain of trust provides increased security, as well as allowing expanded capabilities. For example, the ability to add value to a smart card need not be limited to a few trusted systems, but rather can extend to various devices in a cashless transaction system that can at least periodically communicate with a cashless server or host systems. As another example, devices may communicate with a smart card using public key encryption, so the private key associated with the smart card is not known to other devices. Since different smart cards may have different private keys, the discovery of a cryptographic key associated with one smart card will not compromise use of other smart cards.

In addition, one or more embodiments of the present disclosure are not limited to proprietary smart card hardware or memory sizes. Thus, the costs for each smart card according to the techniques disclosed herein may be significantly reduced as compared to traditional techniques. Further, smart cards need not be limited to a three byte purse.

In one or more embodiments, changing a value or configuration parameter on a smart card may include one or more of the following operations: a system may read one or more parameter(s) stored on a smart card, an application on the smart card (e.g., a Patron Management module and/or applet) may call a function on the application to make a change, the application may validate one or more permissions and/or rules, the application may make one or more changes to the card, a player may specify an amount of money to move to and/or from the card, and/or the appropriate money may be moved to an Electronic Gaming Machine (EGM) when the card is inserted into the EGM and after checking one or more configuration values and/or performing one or more security validations, etc.

In one or more embodiments, by having an application running on the card, rules may be embedded within the card to perform specific operations. For example, an application may run on the card that automatically triggers a transaction which seeks to replenish funds when a given balance falls below a specified threshold. Such an application may include one or more of the following operations: a system may read one or more parameter(s) stored on a smart card; an application on the smart card (e.g., a Patron Management module and/or applet) may call a function on the application to make a change; the application may validate one or more permissions and/or rules; the application may make one or more change to the card; a player may specify a credit threshold balance that may trigger an automatic transfer; and/or the appropriate amount of cash and/or credit may be moved when the card is inserted into an EGM, when the configuration value is checked, after one or more credit balances on the EGM are below the specified balance threshold, and/or after performing one or more security validations.

In one or more embodiments, running one or more applications on a smart card may guard against attempts by unauthorized individuals to access an account. For example, one or more applications on a smart card may perform one or more of the following operations: attempt to validate security if a connection is made to the card; update a record of invalid access attempts if the attempt to validate security is unsuccessful; compare the record of invalid access attempts against a pre-defined limit; make the cashless gaming system aware of one or more illegal access attempts; and/or render the card useless if the number of invalid access attempts exceeds the pre-defined limit. In one or more embodiments, information can be retrieved from a smart card but the applications can no longer change any information once the smart card is rendered useless.

In one or more embodiments, techniques disclosed herein may permit cashing out even when a smart card is not in communication with a gaming machine (i.e. no-card cash-out). Such techniques may include one or more of the following operations: receiving a request to cash out; determining whether a valid smart card is inserted; transferring credit and/or cash to the card if a valid smart card is present; transferring money from the EGM (e.g., to a Slot Machine Interface Board (SMIB)) if a valid smart card is not present; holding the cash and/or credit in non-volatile memory (e.g., in the SMIB); putting the EGM out of service; sending a notification of a no card cash out; receiving a valid smart card (e.g., a new card brought by a casino attendant); checking security and/or validating the smart card; moving cash and/or credit to the received smart card; putting the EGM back into service.

Thus, in one or more embodiments, the present disclosure describes techniques that may offer a more secure and flexible smart card design than currently exists. It should be noted that although the some techniques may be described in reference to wager-based gaming in a casino environment, these techniques are not limited to gaming but may be applicable to any or all applications and/or industries involving smart cards. Even in the gaming context, one or more techniques described herein may be used to facilitate other cashless transactions in a casino environment, such as payment for meals, hotel rooms, or other gaming-related expenditures.

Specific details related to techniques for smart card operations and/or cashless gaming in a gaming environment are discussed in U.S. Pat. No. 6,852,031, "EZ Pay Smart Card and Tickets System," by Richard Rowe, filed on Nov. 22, 2000, and U.S. Pat. No. 5,902,983, "Preset Amount Electronic Funds Transfer System for Gaming Machines," by Crevelt et al., filed on Apr. 29, 1996, both of which are hereby incorporated by reference for all purposes.

FIG. 1 shows a block diagram illustrating cashless gaming system 100, which includes system components associated with smart card initialization and/or utilization. According to various embodiments, cashless gaming system 100 may be operable to perform one or more operations relating to cashless gaming, such as one or more operations described herein with reference to FIGS. 5-13. In one or more embodiments, cashless gaming system 100 may be operable to perform one or more operations related to security validation and/or verification procedures, such as those discussed in U.S. patent application Ser. No. 11/967,916, which has been incorporated by reference.

Cashless gaming system 100 includes gaming apparatus 104. In the embodiment of FIG. 1, gaming apparatus 104 is a gaming machine. Additional details regarding gaming machines are discussed herein, and specifically with respect to FIG. 14. However, according to various embodiments, different types of gaming apparatuses may include one or more components related to cashless gaming. For example, in different embodiments gaming apparatus 104 may instead be a bank of gaming machines, a kiosk, a cashier's terminal, a patron management terminal, a card initialization terminal, or one or more other devices.

Gaming apparatus 104 includes a slot machine interface board (SMIB) 108. An example of a SMIB according to one or more embodiments is the Bonus Engine® available from IGT of Reno, Nev. However, it should be noted that although gaming machine 104 includes a SMIB, different implementations may include one or more different control components configured to perform similar operations as SMIB 108. For example, if gaming apparatus 104 were a kiosk or a patron management system, rather than a gaming machine, a different device may be used in addition to or instead of a SMIB. In some embodiments, a patron management system or cashier client may include a device (e.g., an Omnikey 3821 device, available from HID of Walluf, Germany) for reading a smart card in a credit card form factor. One or more systems with an STM device may include a device (e.g., an Omnikey 3121 device, available from HID) for reading a smart card in a SIM card form factor.

SMIB 108 includes CPU 140 and memory 144. The SMIB is in communication with other components in the gaming apparatus 104, such as a card reader 112, a user input device 116, and a display 120. In one or more embodiments, the SMIB may communicate with these devices, and/or other devices not illustrated in FIG. 1, via one or more serial links. However, according to different embodiments, one or more different types of communication links may be used. In one or more embodiments, the SMIB 108 may communication with one or more remote devices, such as host systems 124, via a communication link 128. In one or more embodiments, communication link 128 is a network link in a gaming network. Additional details related to gaming networks are discussed throughout the specification, and particularly with respect to FIGS. 15 and 16. In one or more embodiments, the communication link 128 may include one or more of an Internet link, a satellite link, a wireless link, etc.

In one or more embodiments, the SMIB may be configured or designed to control one or more components in the gaming apparatus, such as the card reader 112, the user input device 116, and/or the display 120. In addition, or alternately, the SMIB may be operable to communicate with one or more different components at the gaming apparatus not illustrated in FIG. 1. For example, the SMIB 108 may communicate with one or more components of the gaming machine, such as a master gaming controller, a display device, a service window, etc. As another example, a SMIB, STM, and/or other component associated with the cashless gaming system may communicate with one or more different types of devices or interfaces, such as a motherboard, a controller, a network interface, a service window, a kiosk (e.g., a system having a ticketing interface), a display device (e.g., a vacuum fluorescent display, a NexGen or sbNexGen available from IGT, etc.), or any other type of device.

Some embodiments of the cashless gaming system may be configured for use in systems that are not under the control of the casino. One such use may be a point-of-sale interface in which a smart card reader and STM is installed in one or more stores, restaurants, hotel facilities (e.g., service desks, cafes, gift shops), or other commercial locations. Such a configuration may allow a player to use the smart card to pay for non-gaming goods or services. A smart card configured for use in such a system may include more than one purse (i.e. credit balance). The use of more than one purse may allow a casino to provide different types of credit on a smart card (e.g., gambling credits, cash, promotional dollars, bonus points, loyalty points, etc.) and/or avoid co-mingling gaming and non-gaming funds (e.g., for regulatory compliance).

As stated herein, the SMIB includes memory 144. In one or more embodiments, memory 144 may include program instructions for CPU 140, such as program instructions relating to performing one or more operations for cashless gaming. In one or more embodiments, memory 144 may store one or more parameter values related to cashless gaming. For example, memory 144 may store a credit balance for transfer between gaming apparatus 108 and a smart card, such as a smart card in communication with smart card slot 132. In one or more embodiments, memory 144 is non-volatile memory. Thus, in the event of a system reset, a credit value stored on memory 144 may be maintained in event of a system failure, loss of power, and/or reset.

In some embodiments, the SMIB may function according to a Transaction Complete model in which activity is not recorded to a transaction record until the transaction is completed on the smart card. Thus, if a transaction is interrupted before it can be completed (e.g., by power loss), the partially completed transaction may not be recorded in the cashless gaming system. The Transaction Complete model may thus prevent cash from being lost (e.g., transferred from an STM but not recorded on a smart card) or duplicated (e.g., transferred to a smart card but not removed from an STM).

A card reader 112 is illustrated in FIG. 1. Card reader 112 may be operable to communicate with slot machine interface board 108. According to different embodiments, the card reader 112 may include one or more communication interfaces for communicating with one or more portable electronic devices. For example, the card reader 112 includes a smart card slot 132 and a SIM card slot 136. However, according to different embodiments various numbers, types, and/or combinations of communication interfaces may be used.

In FIG. 1, reference numeral 132 denotes a smart card slot. Smart card slot 132 may be operable to communicate with a portable electronic device, such as a smart card. In one or more embodiments, a smart card slot may be a physical slot into which a smart card may be inserted. Alternately, or additionally, the smart card slot 132 may be a wireless communication interface configured to communicate wirelessly with a smart card and/or a different type of portable electronic device.

In one or more embodiments, the card reader 112 may communicate with one or more portable electronic devices operable to store a credit balance for cashless gaming. For example, the card reader 112 may communicate with a smart card via smart card slot 132. In such embodiments, smart card slot 132 may be positioned so as to be accessible to a user of gaming apparatus 104. For example, smart card slot 132 may include a physical slot on the external surface on the gaming apparatus 104.

Reference numeral 136 denotes a SIM card slot. In one or more embodiments, SIM card slot 136 may be configured to communicate with a portable electronic device, such as a smart card designed or configured in accordance with one or more of the Subscriber Identity Model (SIM) card form factors. As with the smart card slot 132, the SIM card slot 136 may be a physical slot, a wireless communication interface configured to communicate wirelessly with a SIM card or other portable electronic device, or any other type of communication interface.

In one or more embodiments, the card reader 112 may communicate with one or more portable electronic devices operable to facilitate communications/security functions, such as a Secure Transaction Module (STM) card. For example, the card reader 112 may communicate with a S™ card embodied in a SIM card format via the SIM card slot 136. In one or more embodiments, the STM card may perform one or more encryption, decryption, and/or security validation operations associated with communications between a smart card and the gaming apparatus 104. For example, the STM card may encrypt communications transmitted from the SMIB 108 to a smart card. As another example, the STM card may decrypt communications transmitted from the smart card to the gaming apparatus 104.

In one or more embodiments, using an STM card for securing communications between the gaming apparatus 104 and a smart card may have one or more advantages. For example, it may be easy to add and/or remove the STM card from the gaming apparatus 104. Thus, the STM card could be easily replaced with a different STM card. As another example, security operations may be performed independent of other functions of the gaming machine and/or SMIB. As yet another example, the STM card may be preconfigured to perform one or more operations specific to one or more specific types of gaming apparatuses. Additional details regarding STM cards are discussed in relation to FIG. 4.

In one or more embodiments (e.g., one or more embodiments in which card reader 112 is operable to communicate with a STM card via the SIM card slot 136), the gaming apparatus 104 may include one or more security features for protecting access to SIM card slot 136. In one or more embodiments, the card reader 112 may be configured or designed such that SIM card slot 136 is hidden from a user during the normal course of operation of gaming machine 104. For example, card reader 112 may be configured or designed such that in order to add or remove a card from SIM card slot 136, the door of the gaming machine must be opened. As another example, unauthorized access to the SIM card slot 136 may require one or more digital and/or physical keys, trigger an audible and/or silent alarm, etc.

Although an embodiment of the card reader 112 illustrated in FIG. 1 is described as communicating with an STM card via SIM card slot 136 and communicating with a player's smart card via smart card slot 132, different embodiments may include different configurations. For example, according to different embodiments, either or both the player's smart card and the STM card may be embodied in one or more smart card formats, SIM card formats, or any other type of format for a portable electronic device. As another example, in one or more embodiments, an STM card may be physically coupled with a gaming apparatus such that the card communicates with one or more components of the gaming apparatus without communicating via a removable slot. For example, the STM card may be a hardware and/or software component coupled with one or more components of the gaming apparatus and configured via an interface on the gaming apparatus (e.g., over a network, via a user interface, using a remote device, etc.).

In FIG. 1, reference numeral 116 denotes a user input device. According to various embodiments, the user input device 116 may be any input device configured or designed to receive user input. For example, the user input device 116 may be a touch pad, a touch screen, a keypad, a keyboard, a button panel, etc.

In one or more embodiments, the user input device may receive user input related to cashless gaming. For example, the user input device may receive a request to move cash and/or credit between the gaming apparatus and a portable electronic device in communication with the card reader 112 (e.g., a smart card in communication with smart card slot 132. As another example, the user input device may receive a request to update one or more parameter values on a smart card in communication with the card reader 112 (e.g., an updated player name, preferred language, auto-transfer threshold value, auto-transfer amount, etc.).

Reference numeral 120 denotes a display. According to various embodiments, different types of displays may be used. For example, the display 120 may be an LCD, an LED display, a plasma display, a seven-segment display, etc. In one or more embodiments, user input device 116 and display 120 may be part of the same device (e.g., a touch screen display).

The display 120 may be operable to display information related to cashless gaming. For example, the display 120 may show one or more parameter values stored on a portable electronic device in communication with card reader 112, such as one or more parameter values (e.g., player names, preferred languages, auto-transfer amounts, auto-transfer thresholds, credit balances, etc.) stored on a smart card in communication with smart card slot 132. In one or more embodiments, the display 120 may show options for modifying one or more values on a portable electronic device in communication with smart card slot 132 (e.g., a list of possible preferred languages, a selection of approved auto-transfer threshold values, a selection of approved auto-transfer amounts, etc.).

In FIG. 1, reference numeral 124 denotes host systems. Host systems 124 may include one or more servers related to cashless gaming. Slot machine interface board 108 and host systems 124 may be configured to communicate via one or more network links, such as network link 128. In one or more embodiments, network link 128 may be a network link in a gaming network at a casino. Further details of a gaming network will be discussed in relation to FIG. 17. However, according to different embodiments, network link 128 may include one or more communication links in a public network, such as the internet.

Figure 2:
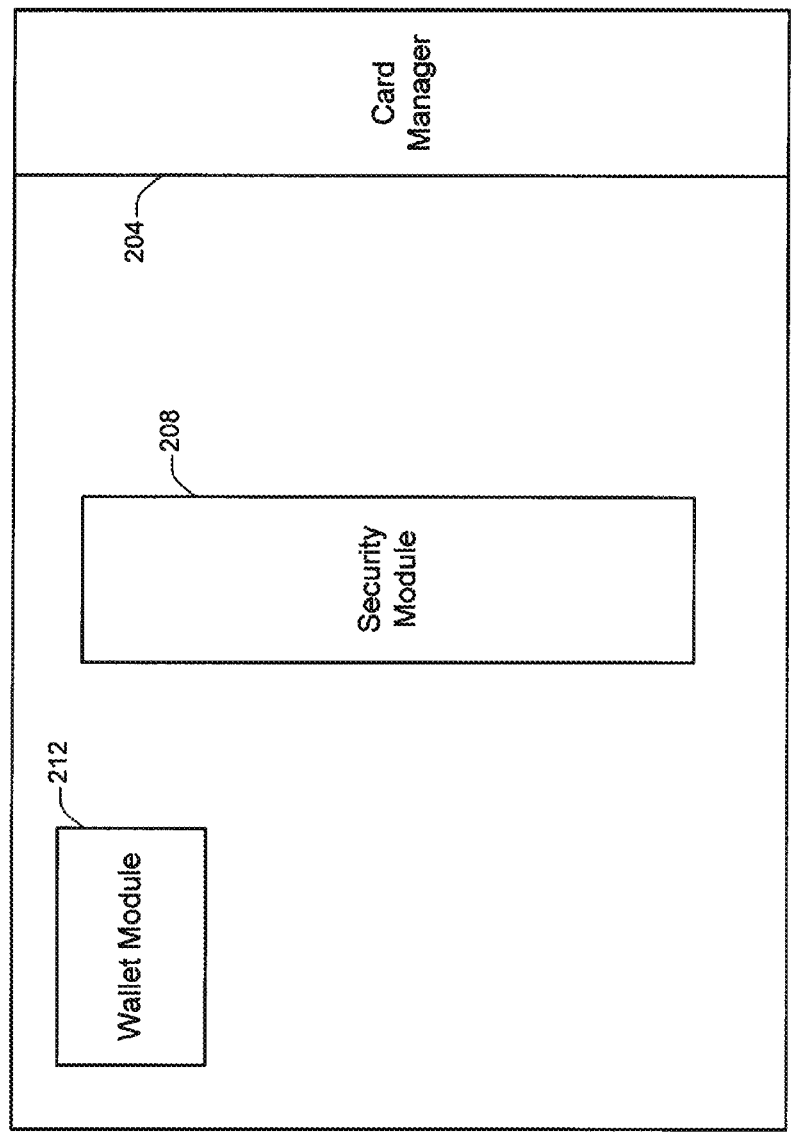
FIG. 2 shows a block diagram 200 illustrating an unregistered player smart card, constructed in accordance with one embodiment of the present invention.
Figure 3:
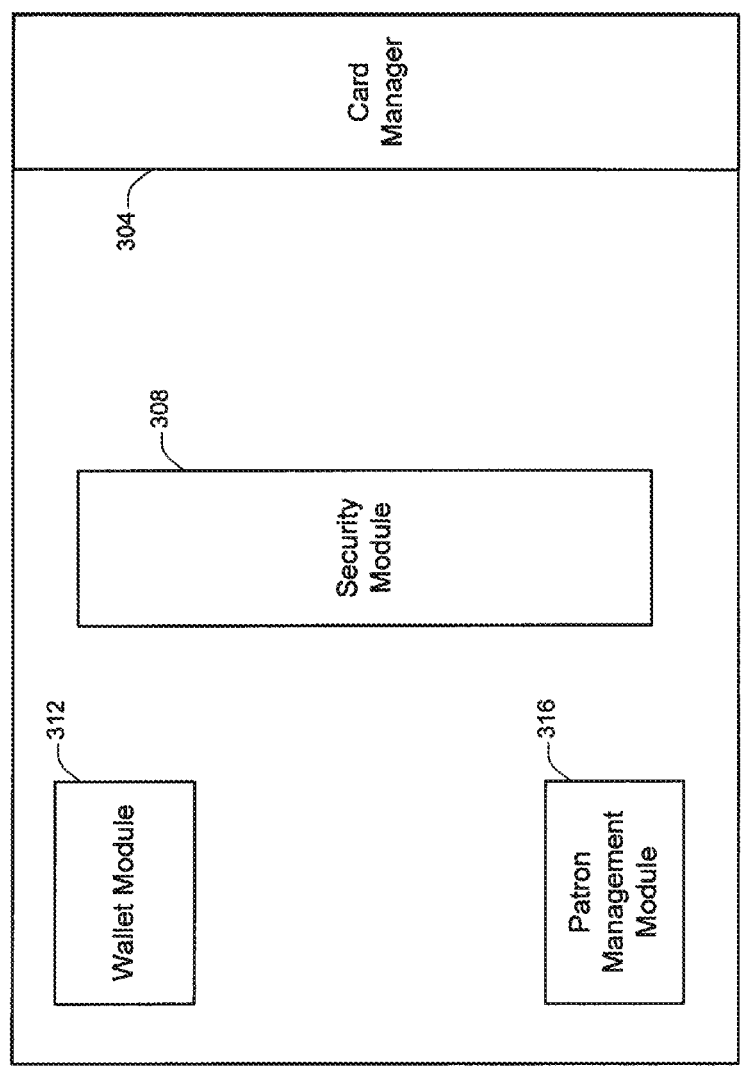
FIG. 3 shows a block diagram 300 illustrating a registered player smart card, constructed in accordance with one embodiment of the present invention.
Figure 4:
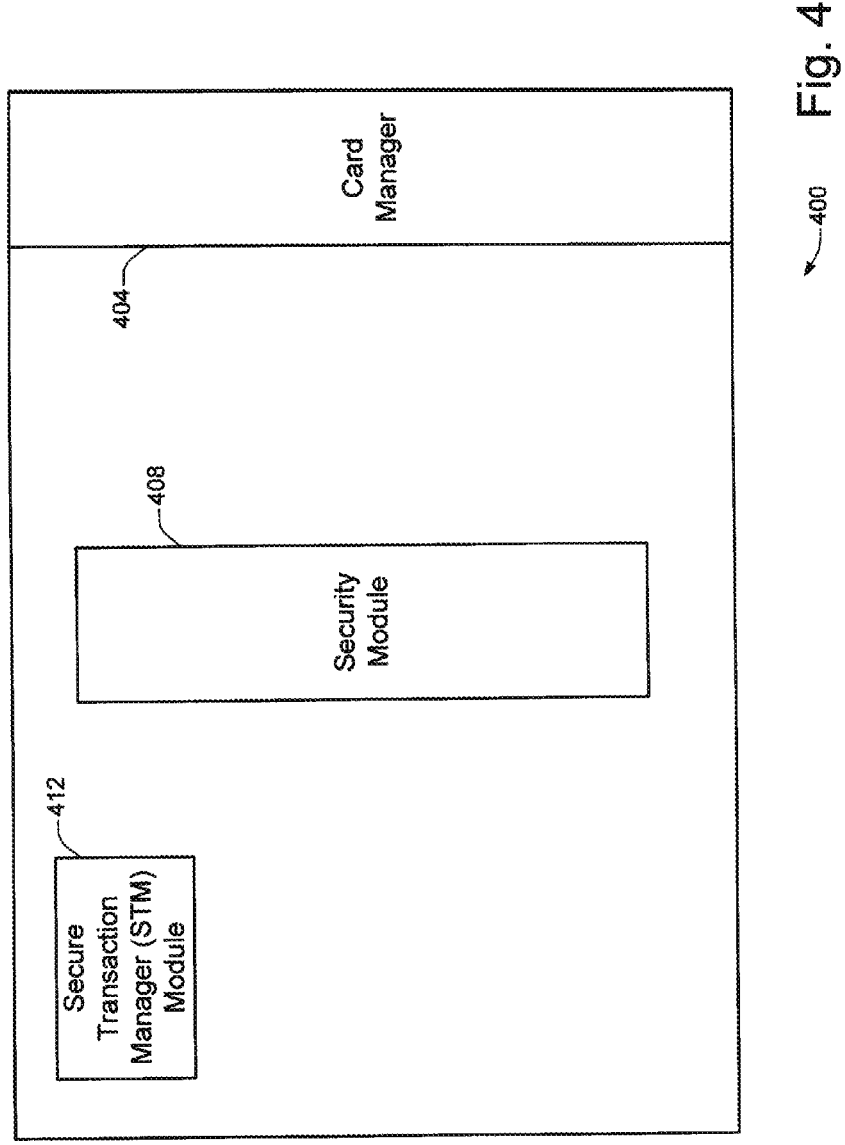
FIG. 4 shows a block diagram 400 illustrating a smart card for use in a cashless gaming device, constructed in accordance with one embodiment of the present invention.

Examples of the types of portable electronic devices that may communicate with one or more components of the gaming apparatus 104 via the smart card reader 132 and/or SIM card slot 136 are smart cards 200, 300, and 400 shown in FIGS. 2, 3 and 4. Smart cards 200, 300, and 400 are portable electronic devices that each have memory and one or more processors. In addition, smart cards 200, 300, and 400 are each operable to communicate with one or more other devices in a cashless gaming system and/or casino environment.

Smart cards 200, 300, and 400 are Java smart cards designed to execute one or more programs, applications, and/or applets written in the Java programming language. However, according to different embodiments, various types of programming languages may be used for various components in the cashless gaming system, such as C, C++, C#, .Net, etc. In addition, according to various embodiments one or more of smart cards 200, 300, and/or 400 may be embodied in various shapes or form factors. For example, a smart card may be embodied in a SIM card, a credit card sized smart card, or any other type of portable electronic device.

FIG. 2 shows a smart card 200 that is configured or designed for use by one or more players in a casino environment, in accordance with one embodiment of the present invention. Smart card 200 is an unregistered smart card (e.g., a "day use" smart card) that does not include personal identification information (e.g., name, identification number, and/or is not tied to a particular user.

In one or more embodiments, the unregistered smart card 200 is operable to communicate with one or more other devices in a gaming network by being placed in a smart card slot, such as the smart card slot 132. However, in different embodiments, smart cards may communicate using one or more different techniques, for example communication via a SIM card slot (e.g., SIM card slot 136) and/or wireless communication.

Unregistered smart card 200 may include one or more hardware and/or software modules for performing functions related to cashless gaming. Each module may include data and/or program instructions. In one or more embodiments, one or more modules may be preloaded on the unregistered smart card 200 when the smart card is constructed. In addition, or alternately, one or more modules may be configured and/or loaded on the unregistered smart card 200 via a device in a casino environment such as a gaming machine. Unregistered smart card 200 includes a card manager 204, a security module 208, and a wallet module 212.

The card manager 204 is a hardware and/or software module that includes data and/or program instructions for accessing one or more features on the unregistered smart card 200. In one or more embodiments, the card manager 204 comes preconfigured on new smart cards. However, in different embodiments, the card manager 204 may be added and/or configured by one or more devices in a cashless gaming system.

The card manager 204 may include identification information specific to the individual unregistered smart card 200, such as a smart card serial number. In one or more embodiments, the smart card manager 204 may include one or more cryptographic access keys and/or cryptograms for accessing the unregistered smart card 200. For example, card manager 204 may include standard keys that are loaded on the smart card during construction.

In one or more embodiments, at least some information stored in smart card manager 204 may be unalterable. For example, it may be impossible to alter the smart card serial number and/or one or more cryptographic access keys without rendering the smart card inoperable. Alternately, or additionally, it may be possible to alter one or more of the values (e.g., with appropriate security verification).

According to various embodiments, card manager 204 may permit adding, removing and/or configuring other modules on the smart card. For example, card manager 204 may permit adding, removing, and/or configuring security module 208 and/or wallet module 212.

The security module 208 is a hardware and/or software module that includes data and/or program instructions for performing one or more functions related to access control and/or security verification. For example, the unregistered smart card 200 may receive one or more requests to read and/or update one or more values stored in the memory of the unregistered smart card 200. In one or more embodiments, some or all requests to access and/or update values must be validated by the security module 208 before being performed by one or more modules on the smart card.

Thus, in one or more embodiments, the security module 208 may include one or more pieces of information related to authenticating request to access the unregistered smart card 200. For example, the security module 208 may include a Personal Identification Number (PIN) and/or one more cryptographic keys for enabling secure communication. In addition, the security module 208 may store information relating to one or more previous transactions, previous authorizations of the smart card, transaction counts, serial numbers (e.g., a unique serial number associated with the smart card), etc. The different values stored on the smart card (e.g., in the security module) may alternately be user-configurable, configurable by the casino, or not configurable (e.g., a card serial number). In some embodiments, values configurable by a casino may be updated when a card is accessed at an STM device. In this way, a casino may push out new parameter values to be stored on smart cards upon their next use.

In addition, in one or more embodiments, the security module 208 may include program instructions for authenticating one or more requests to access the unregistered smart card 200. For example, the security module 208 may include program instructions for performing one or more functions related to secure cryptographic communications. In addition, the security module 208 may include program instructions for verifying that the sender of a request to access one or more values on the unregistered smart card 200 has the appropriate security permissions for performing said access.

The wallet module 212 is a hardware and/or software module that includes data and/or program instructions for performing one or more operations related to storing and/or transferring cash and/or credit values for cashless gaming. For example, the wallet module may be configured to store one or more credit balances. A credit balance may be an amount of credit and/or cash available for use in gambling in a casino environment. The wallet module 212 may also include program instructions for one or more programs related to adding and/or removing credit from the wallet module 212.

In one or more embodiments, the wallet module 212 may be configured or designed to store one or more parameter values related to adding and/or removing credits stored on the wallet module. For example, the wallet module may store one or more auto-transfer threshold values. An auto-transfer threshold value may be used to determine when to automatically transfer additional credit from the smart card (e.g., credit stored in the wallet module 212) to a gaming machine. When the unregistered smart card 200 is in communication with the gaming machine, a determination may be made as to whether one or more credit balances on the gaming machine (e.g., for playing a game of chance) has dropped below the auto-transfer threshold value stored on the wallet module. If the credit balance on the gaming machine is less than the auto-transfer threshold value on the wallet module, additional credit may be moved from the smart card to the gaming machine.

As another example, the wallet module 212 may be configured to store one or more auto-transfer amounts. When credit is automatically transferred from the wallet module 212 to a gaming machine, the amount of credit may be determined in accordance with the auto-transfer threshold value. According to different embodiments, different techniques for determining the amount of credit may be used. For example, the amount of credit transferred from the smart card to the gaming machine may be determined so as to raise the balance on the gaming machine to the sum of the auto-transfer threshold value and the auto-transfer threshold amount. Alternately, the amount of credit transferred from the smart card to the gaming machine may be substantially equal to the auto-transfer threshold amount.

According to various embodiments, various techniques may be used to add and/or modify one or more parameter values stored on the unregistered smart card 200. In one or more embodiments, one or more parameter values may be determined and/or stored on the smart card upon initialization of the card (e.g., at an initialization terminal), at a cashier's terminal, at a kiosk, at a patron management terminal, at a gaming machine, etc. In one or more embodiments, permission to change one or more values stored on the smart card may be limited to one or more specific types of gaming apparatuses. For example, a casino may require supervision by casino personnel in order to change the auto-transfer threshold value and/or auto-transfer amount, since setting these values too low may in some instances cause excessive credit transfers during game play and/or excessive wear and tear on the card. Alternately, a casino may provide a range of preapproved values and/or permit card users to change one or more values without supervision (e.g., at a gaming machine, kiosk, etc.).

In one or more embodiments, a casino may restrict the values that may be used as the auto-transfer threshold value and/or auto-transfer amount so as to reduce excessive wear at the smart card and/or to impose operational limits on credit transfers. For example, a casino may impose a maximum auto-transfer amount of $10,000 in a High Limit gaming room and a maximum auto-transfer amount of $100 on the main floor. Such game-specific or area-specific restrictions may prevent a player from transferring an excessive amount of credit to a low-denomination gaming machine (e.g., $5,000 transferred to a $0.25 slot machine). Thus, even if a player's auto-transfer amount is set at $200, the actual value transferred to the gaming machine on the casino floor would be limited to $100 in this example. In this way, the casino can balance player preferences with operational concerns such as security and risk management.

In some embodiments, limits on auto-transfer parameters may be imposed for individual games, for groups of games, for specific smart cards (e.g., for individual players), for groups of players, for different casino properties, etc. Furthermore, the types of limits imposed may include threshold values (e.g., as discussed in the preceding paragraph), percentage-based restrictions (e.g., an auto-transfer value limited to 75% of the credit balance), or other types of limitations. In some embodiments, more than one limit on a smart card parameter may be imposed FIG. 3 shows a block diagram 300 illustrating a registered player smart card, constructed in accordance with one embodiment of the present invention. Smart card 300 is a registered smart card that includes personal identification information and/or other information (e.g., name, identification number, etc.) associated with one or more specific users.

In one or more embodiments, the registered smart card 300 may be operable to communicate with one or more other devices in a gaming network by being placed in a smart card slot, such as the smart card slot 132. However, in different embodiments, the registered smart card 300 may communicate using one or more different techniques, for example communication via a SIM card slot (e.g., SIM card slot 136) and/or wireless communication.

The registered smart card 300 may include one or more hardware and/or software modules for performing functions related to cashless gaming. Each module may include data and/or program instructions. In one or more embodiments, one or more modules may be preloaded on the registered smart card 300 when the smart card is constructed. In addition, or alternately, one or more modules may be configured and/or loaded on the registered smart card 300 via a device in a casino environment such as a gaming machine.

In may respects, the registered smart card 300 may be substantially similar to the unregistered smart card 200 shown in FIG. 2. For example, the registered smart card 300 includes a card manager 304, a security module 308, and a wallet module 312 that may be substantially similar to the corresponding modules illustrated in FIG. 2.

In some embodiments, the wallet module 312 may be configured to store and access multiple purses or credit balances. Furthermore, the various credit balances may be denominated in cash, casino credits, points, or any other units. Different credit balances that may be stored on the smart card may include, but are not limited to, one or more of the following: a gambling balance, a non-gambling balance, promotional dollars, bonus points, loyalty points, player tracking points, etc.

In some embodiments, access to different purses may be limited to specific STMs, or STMs in particular types of machines. That is, only certain STMs may possess the security permissions necessary to access purses. For example, access to gambling-related purses may be limited to gaming machines, cashier terminals, etc. Access to promotional purses may be limited to patron management terminals or systems where awards may be redeemed. Access to non-gambling cash may be limited to point-of-sale interfaces (e.g., in shops or restaurants) and cashier's terminals.

Enforcing these types of access controls may provide casinos with the ability to facilitate flexible smart card use while retaining control over access to disparate purses by different systems and entities. Further, enforcing separation of funds may assist in ensuring that embodiments of the cashless gaming system comply with regulatory requirements related to separation of gambling and non-gambling funds.

In some embodiments, access to different purses may be controlled by different PINs. For example, access to one or more gambling-related purses may require a first PIN, while access to one or more non-gambling purses may require a second PIN. Separate access controls may allow, for instance, a player to lend a smart card to a different person (e.g., a minor) for limited uses (e.g., non-gambling uses, restaurant purchases, shop purchases, hotel purchases, redemption of awards, etc.).

In addition to the components included in the unregistered smart card 200, registered smart card 300 includes a patron management module 316. The patron management module 316 is a hardware and/or software module that includes data and/or program instructions for performing one or more user-specific operations. For example, the patron management module 316 may store information related to one or more names, ranks, player identification numbers, PINs, preferred languages, and/or other information specific to one or more users. As another example, the patron management module 316 may include program instructions associated with verifying a user's identity and/or performing one or more player tracking operations.

The patron management module may also be used to store and/or adjust one or more non-cash values related to loyalty awards, extra credits, offline bonuses, etc. In some embodiments, if a player is credited with a free meal or free game plays, those values may be stored on the smart card by the patron management module. Then, the player may redeem the credit or award by presenting the smart card at the appropriate time.

According to various embodiments, various techniques may be used to add and/or modify one or more parameter values stored on the registered smart card 300. In one or more embodiments, these techniques may be similar to those discussed with respect to unregistered smart card 200. However, in one or more embodiments, registered smart card 300 may be treated differently than unregistered smart card 200. For example, a casino may not require authentication steps in order to change values stored on the unregistered smart card 200 since the unregistered smart card 200 is not tied to a specific user. In contrast, since registered smart card 300 is tied to a specific user, a casino may require that the user provide identification information (e.g., an ID card, biometric identification information, etc.) and/or perform one or more electronic authentication operations in order to modify one or more values stored on the smart card. As another example, a user associated with registered smart card 300 who wishes to change one or more values stored on a registered card may need to provide identification information to casino personnel (e.g., at a kiosk, patron management terminal, etc.).

FIG. 4 shows a block diagram 400 illustrating a smart card for use in a cashless gaming device, constructed in accordance with one embodiment of the present invention. The smart card shown in FIG. 4 is configured or designed for use as an Secure Transaction Module (STM) card. The STM card 400 may be configured and/or designed for use in performing and/or facilitating one or more security validation and/or communication operations associated with secure transactions at a gaming apparatus.

In one or more embodiments, the STM card 400 may be operable to communicate with one or more other devices in a gaming network by being placed in a SIM card slot, such as the SIM card slot 136. However, in different embodiments, the STM card 400 may communicate using one or more different techniques, for example communication via a smart card slot (e.g., the smart card slot 132) and/or wireless communication.

The STM card 400 may include one or more hardware and/or software modules for performing functions related to cashless gaming. Each module may include data and/or program instructions. In one or more embodiments, one or more modules may be preloaded on the STM card 400 when the smart card is constructed. In addition, or alternately, one or more modules may be configured and/or loaded on the STM card 400 via a device in a casino environment such as a gaming machine.

In many respects, the STM card 400 may be substantially similar to the unregistered smart card 200 shown in FIG. 2 and the registered smart card 300 shown in FIG. 3. For example, the STM card 400 includes a card manager 404 and a security module 408 that may be substantially similar to the corresponding modules illustrated in FIGS. 2 and 3. However, since the STM card 400 is not issued to a player, it may not need to include, for example, a wallet module and/or patron management module.

Another difference between the STM card 400 and the smart cards 200 and 300 shown in FIGS. 2 and 3 is that the STM card 400 includes a Secure Transaction Manager (STM) module 412. The STM module 412 is a hardware and/or software module that includes data and/or program instructions for performing one or more operations related to securely facilitating cashless gaming transactions (e.g., with a smart card). In one or more embodiments, the STM module 412 may be operable to communicate with a smart card (e.g., via the card reader 112). Additionally, or alternately, the STM module 412 may be operable to communicate with one or more servers in a cashless gaming system (e.g., the host systems 124).

In one or more embodiments, the STM module 412 includes one or more cryptographic keys for communication using a secured cryptosystem (e.g., a public key cryptosystem). In this way, communication between the STM module 412 and a smart card (e.g., a smart card in communication with smart card slot 132) may be encrypted. In addition, or alternately, communication between the STM module 412 and one or more system components (e.g., SMIB 104) and/or remote servers (e.g., host systems 124) may be encrypted. In one or more embodiments, the STM module 412 may be registered with one or more remote servers.

Such registration may take place, for example, each time a gaming machine or cashless gaming terminal is powered up. Alternately, or additionally, registration may occur during use of the gaming machine or cashless gaming terminal (e.g., at scheduled times, intermittently, etc.). In some embodiments, the registration process may be integrated with one or more procedures for registering gaming machines, such as the Advantage Bonus System and/or Easy Pay systems available from IGT.

At certain instances, use of a smart card at a gaming apparatus may involve authenticating the smart card to a remote server, such as a cashless gaming server. Such authentication may involve, for example, verifying the authenticity of the smart card (e.g., using one or more cryptographic keys), verifying one or more previous transactions associated with the smart card, verifying the identity of the smart card user, etc.

In one or more embodiments, an authentication attempt may be made during, before, and/or after each cashless gaming session and/or other use of the smart card. Alternately, an authentication attempt may be made only upon occasion (e.g., periodically, when triggered, etc.).

However, in some instances, such authentication may be impossible and/or impracticable. For example, one or more network elements and/or servers may be temporarily and/or periodically inoperable. As another example, the gaming apparatus at which the card is being used may not enjoy continuous communication with a cashless gaming server.

Thus, in one or more embodiments, the STM module 412 may include one or more parameter values associated with one or more offline windows. An offline window value may represent, for example, a length of time between the last authenticated use of a specific smart card and the time in which it must be authenticated again before it can be used further. In one or more embodiments, the offline window is 24 hours, which means that if a given smart card has been authenticated with a remote cashless gaming server at a particular time (e.g., during use for a cashless gaming session), that smart card may be used for 24 hours without requiring that the smart card be authenticated again with a remote cashless gaming server. According to various embodiments, the offline window may be any value between 0 hours (e.g., offline use is not permitted) to several weeks.

Thus use of an offline window may allow the player to use the smart card even if remote authentication of the card is not performed. However, if it is determined that the previous authenticated use of the smart card falls outside of the offline use window, then the gaming apparatus may refuse to add and/or retransfer credit from the smart card. Further details of the use of offline windows are discussed in relation to FIGS. 9, 11, and 13.

In one or more embodiments, one or more parameter values stored on the STM card 400 may be stored upon initialization of the STM card. For example, the STM card 400 may store one or more parameters related to offline windows, cryptographic keys, card value limits for unregistered smart cards, etc. Storing one or more parameter values on the STM card may allow the casino to exercise control over the cashless gaming system, such as providing useful ways to manage risk. For example, a casino may dynamically alter the maximum credit balance that may be stored on unregistered smart cards. If the casino knows that there are many players using unregistered smart cards, for instance, the casino may reduce the maximum credit balance that may be stored on unregistered smart cards in order to reduce risk (e.g., in the event of system failure).

In one or more embodiments, such parameters may not be modified after they have been stored on the card. For example, the STM card 400 may include non-volatile memory so as to thwart attempts to tamper with the STM card 400. However, in different embodiments, it may be possible to modify one or more parameter values stored on the STM card 400 and/or add new parameter values. For example, a casino employee may be able to update one or more parameter values stored on the STM card 400 by accessing the STM card 400 via a gaming apparatus (e.g., by providing appropriate credentials, cryptographic keys, security verification information, etc.).

FIGS. 5-13 show methods related to cashless gaming transactions that may be performed in conjunction with a smart card. According to various embodiments, one or more of the methods may be performed via one or more gaming apparatuses in communication with a smart card and/or S™. For example, one or more methods may be performed via gaming apparatus 104 in communication with a smart card via smart card slot 132 and an STM card via SIM card slot 136. According to various embodiments, one or more of the methods may be performed at various locations. For example, one or more operations associated with the methods may be performed at cashier terminal, at a patron management terminal, at a kiosk, at a gaming machine, etc.

In one or more embodiments, one or more of the methods illustrated in FIGS. 5-13 may be preceded by one or more authentication operations. For example, one or more components associated with a gaming apparatus may communicate with the smart card and/or S™ card to establish a secure communications session. In one or more embodiments, the smart card and STM card may exchange public keys used in a public key cryptosystem and/or exchange session keys.

Although the operations illustrated in FIGS. 5-13 are illustrated as occurring in a particular order, in one or more embodiments one or more methods may include operations may be performed in a different order. In addition, some implementations may include additional operations not illustrated in FIGS. 5-13, and/or some operations may be omitted.

Figure 5:
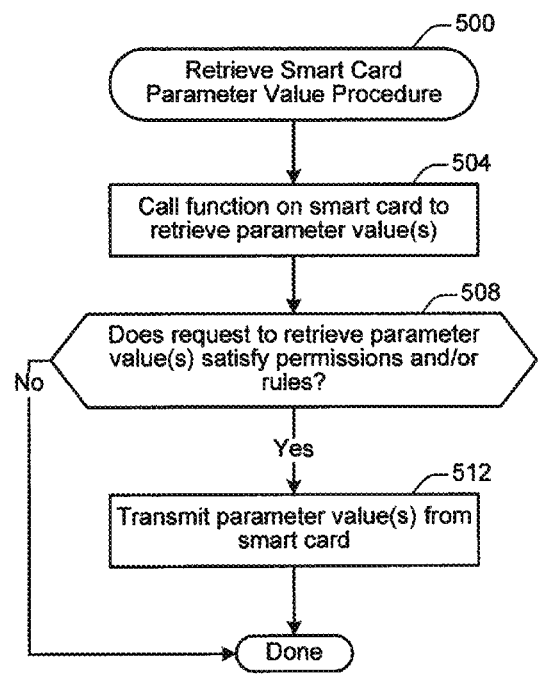
FIG. 5 shows a method 500 for retrieving a smart card parameter value, performed in accordance with one embodiment of the present invention.

FIG. 5 shows a method 500 for retrieving a parameter value from a smart card, performed in accordance with one embodiment of the present invention. The Retrieve Smart Card Parameter Value Procedure 600 may be used to retrieve one or more parameter values stored on a smart card when the smart card is in communication with a cashless gaming apparatus. For example, a smart card user, casino personnel, and/or a program running on a gaming apparatus may make a request to update a parameter value stored on the smart card.

The Retrieve Smart Card Parameter Value Procedure 500 may be performed at various instances and/or upon various triggering events. For example, a smart card user, casino personnel, and/or a program running on a gaming apparatus may make a request to retrieve a parameter value stored on the smart card. As another example, one or more operations illustrated in FIG. 5 may be performed upon card initialization, upon inserting a smart card into a gaming apparatus, etc.

At 504, instructions are transmitted from the cashless gaming apparatus to the smart card to call a function on the smart card to retrieve one or more parameter values. The requested parameter values may include, for example, one or more credit balances, auto-transfer threshold values, auto-transfer amounts, player names, player ranks, player ID's, smart card serial numbers, PINS, etc. In one or more embodiments, the request may be cryptographically signed by the STM card before being transmitted to the smart card.

At 508, a determination is made as to whether the request to retrieve one or more parameter values satisfies one or more permissions and/or rules. In one or more embodiments, the determination is made at an application or software module running on the smart card (e.g., the security module 208). The determination may be made, at least in part, based upon whether the request has been signed and/or encrypted by a valid and/or approved STM card. The determination may involve a handshaking and/or key exchange process. For example, a key signature may be stored in the transaction record on the card and on the STM. If these key signatures match, then the request may be considered valid.

In one or more embodiments, all valid STM cards may have permission to retrieve any value from a smart card. However, in different embodiments, permission to retrieve one or more values from a smart card may be limited to certain types of gaming apparatuses equipped with appropriately configured STM cards. Thus, operation 508 may involve determining whether the STM card that transmitted the request to retrieve one or more parameter values has permission to retrieve those values. For example, an STM card associated with a patron management terminal may not have permission to access values stored in the wallet module, such as an auto-transfer amount. However, an STM card associated with a cashier's terminal may have permission to access one or more values stored in the wallet module, such as a credit balance.

At 512, when it is determined that the request to retrieve one or more parameter values satisfies the permissions and/or rules, the one or more parameter values are transmitted from the smart card to the gaming machine. In one or more embodiments, the parameter values are transmitted as part of a secure communications session between the smart card and an STM card. Thus, the STM card may decrypt the communication from the smart card that includes the parameter values before transmitting the communication and/or the parameter values to a different device in the gaming apparatus, such as the SMIB 104. Alternately, or additionally, one or more parameter values may be transmitted in an unencrypted state.

It should be noted that in one or more embodiments, certain requests to retrieve one or more parameter values may not require the use of operation 508. For example, a smart card may freely transmit information such as a user's name and/or identification number. In different embodiments, however, each request to retrieve one or more parameter values must be validated by the smart card.

Figure 6:
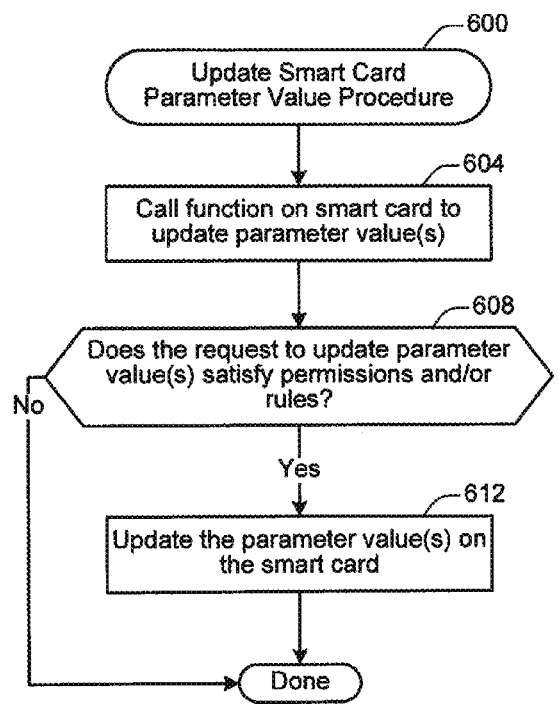
FIG. 6 shows a method 600 for updating a smart card parameter value, performed in accordance with one embodiment of the present invention.

FIG. 6 shows a method 600 for updating a smart card parameter value, performed in accordance with one embodiment of the present invention. The Update Smart Card Parameter Value Procedure 600 may be used to update one or more parameter values stored on a smart card when the smart card is in communication with the cashless gaming apparatus. For example, a smart card user, casino personnel, and/or a program running on a gaming apparatus may make a request to update a parameter value stored on the smart card.

At 604, instructions are transmitted from the cashless gaming apparatus to the smart card to call a function on the smart card to update one or more parameter values. The parameter values included in the update request may include, for example, one or more credit balances, auto-transfer threshold values, auto-transfer amounts, player names, player ranks, player ID's, smart card serial numbers, PINs, etc.

At 608, a determination is made at an application running on the smart card as to whether the request to update one or more parameter values satisfies one or more permissions and/or rules. In one or more embodiments, the determination is made by a security module on the smart card (e.g., the security module 208). The determination may be made, at least in part, based upon whether the request has been signed and/or encrypted by a valid and/or approved STM card.

According to various embodiments, permission to perform one or more operations on a smart card, such as updating a parameter value, may be limited to certain types of gaming apparatuses and/or certain STM cards. Thus, operation 608 may involve determining whether the STM card that transmitted the request to update one or more parameter values has permission to update those values.

For example, an STM card associated with a patron management terminal may not have permission to update one or more parameter values stored in the wallet module, such as an auto-transfer amount. However, an STM card associated with a cashier's terminal may have permission to update one or more parameter values stored in the wallet module.

As another example, an STM card associated with a gaming machine may be permitted to update one or more values associated with the wallet module (e.g., auto-transfer amount and/or auto-transfer threshold values) of an unregistered smart card (e.g., smart card 200), since the unregistered smart card is not tied to the identity of a specific user. However, the same STM card may not have permission to update one or more values associated with the wallet module of a registered smart card, since a casino may wish to validate the identity of a player in person before allowing such a change.

One reason for enforcing such permissions may be security. For example, permission to transfer funds for purposes of cashing out a smart card may be limited to secure devices that are under the control of casino personnel.

Another reason for enforcing such permissions may be to ensure that inappropriate parameter values are not stored to the smart card. For example, as is discussed with respect to FIG. 8, one or more devices in the cashless gaming system may be configured or designed to automatically transfer credit from a smart card when a credit balance on a gaming machine drops below an auto-transfer threshold value. However, if the difference between the auto-transfer threshold value and the auto-transfer amount is too small, the transfers from the smart card to the gaming machine may be too frequent, resulting in excessive wear on the smart card and/or excessive authorization attempts with one or more remote servers. Thus, limiting permission to update values such as the auto-transfer threshold value and/or auto-transfer threshold amount to certain STMs (e.g., STMs installed at gaming apparatuses operated by casino personnel) may ensure that only appropriate parameter values are stored to the smart card. Additionally, or alternately, one or more gaming apparatuses may be configured or designed to automatically enforce restrictions on parameter values.

At 612, when it is determined that the request to update one or more parameter values satisfies the permissions and/or rules, the one or more parameter values are updated on the smart card. In one or more embodiments, the smart card may transmit an indication and/or confirmation that the one or more parameter values were successfully updated. In one or more embodiments, the parameter values are transmitted as part of a secure communications session between the smart card and an STM card. Thus, the STM card may decrypt the communication from the smart card that includes the update confirmation before transmitting the communication and/or an indication that the values were successfully updated to a different device in the gaming apparatus, such as the SMIB 104. In different embodiments, the smart card may not transmit an indication and/or confirmation of a successful update. In such embodiments, the Retrieve Smart Card Parameter Value Procedure 500 shown in FIG. 5 may be used to determine whether one or more parameter values was successfully updated.

It should be noted that in one or more embodiments, certain requests to update one or more parameter values may not require the use of operation 608. For example, a smart card may permit a user, casino employee, and/or program running at a gaming apparatus to update low-security information (e.g., a preferred language) without requiring one or more authentication and/or request validation operations.

Figure 7:
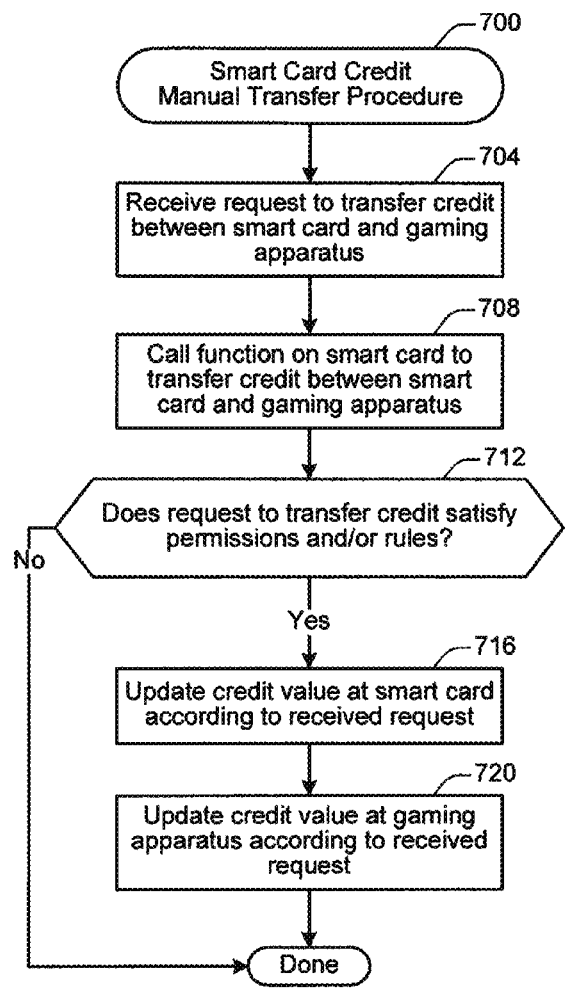
FIG. 7 shows a method 700 for manually transferring credit to or from a smart card, performed in accordance with one embodiment of the present invention.

FIG. 7 shows a method 700 for manually transferring credit to or from a smart card, performed in accordance with one embodiment of the present invention. The Smart Card Credit Manual Transfer Procedure 700 may be used to transfer credit from a gaming apparatus to a smart card or from a smart card to a gaming apparatus. For example, a smart card manual transfer procedure may be used at a cashier terminal in order to add credit to a smart card. The Smart Card Credit Manual Transfer Procedure 700 may also be used at a cashier terminal to convert credit stored on the smart card to cash for providing to a player associated with the smart card. As another example, the Smart Card Credit Manual Transfer Procedure 700 may be used at a gaming machine in order to transfer credit from the gaming machine to the smart card or from the smart card to the gaming machine.

At 704, a request is received to transfer credit between the smart card and a gaming system. According to various embodiments, the request may be received at one or more apparatuses in a cashless gaming system (e.g., a cashier terminal, a gaming machine, etc.).

In some instances, the request to transfer credit may represent a request to transfer credit stored on the smart card to a gaming apparatus. Such a transfer may be requested, for example, to facilitate cashless gaming on a gaming machine or to award cash to a player based on the credit stored on the smart card (i.e. "cash out" the smart card). In other instances, the request to transfer credit may represent a request to transfer credit stored on the gaming apparatus to the smart card. Such a transfer may be requested, for example, to add additional funds to the smart card and/or at the end of a cashless gaming session at a gaming machine.

In one or more embodiments, some requests to transfer credit may be performed by casino personnel and/or may require supervision by casino personnel. For example, permission to request to transfer credit from a smart card to a cashier terminal for the purpose of cashing out a smart card may be limited to designated casino employees, such as cashiers. In addition, or alternately, one or more additional operations may be required when cashing out a smart card. Further details related to cashing out a smart card are discussed in relation to FIGS. 9 and 13.

In one or more embodiments, some or all requests to transfer credit may require a user to provide identification and/or security verification information, such as a PIN. For example, a player may be required to provide a PIN number, produce an ID card or provide other forms of identification information. As another example, a casino employee making a request to transfer credit and/or assisting a user in making such a request may be required to provide a PIN and/or other verification information.

At 708, instructions are transmitted to call a function on the smart card to transfer credit between the smart card and the gaming apparatus. In one or more embodiments, the instructions are transmitted from a component associated with the gaming apparatus, such as the SMIB 104, via an STM card associated with the gaming apparatus (e.g., an STM card in communication with SIM card slot 136).

At 712, a determination is made at an application running on the smart card as to whether the request to transfer credit satisfies one or more permissions and/or rules. In one or more embodiments, the determination is made by a security module on the smart card (e.g., the security module 208). The determination may be made, at least in part, based upon whether the request has been signed and/or encrypted by a valid and/or approved STM card.

According to various embodiments, permission to transfer credit to or from the smart card, may be limited to certain types of gaming apparatuses and/or certain STM cards. Thus, operation 712 may involve determining whether the STM that transmitted the request to update one or more parameter values has permission to update those values. In one or more embodiments, permission to transfer credit to or from a smart card may be limited to a gaming machines and cashier's terminals. However, in different implementations, different security permissions and/or rules may be used.

The determination made at operation 712 may be made at least in part based on whether the request complies with one or more authentication parameters specific to transferring credit. In one or more embodiments, transferring credit between a gaming apparatus and the smart card may require that the user verify knowledge of a PIN that stored on the smart card. In this case, a PIN may be collected from the user of the gaming apparatus and transmitted along with the request to transfer credit at operation 708. Then, the PIN received with the request may be checked against a PIN stored on the smart card, such as a PIN stored in the security module 208 illustrated in FIG. 2. If the PINs do not match, the request to transfer credit may be denied.

At 716, when it is determined that the request to transfer credit satisfies one or more permissions and/or rules, the credit value stored on the smart card is updated according to the received transfer request. For example, if the received request represented a request to transfer credit from the smart card to the gaming apparatus, the credit value stored on the smart card may be decreased by the amount of credit included in the request. As another example, if the received request represented a request to transfer credit from the gaming apparatus to the smart card, the credit value at the smart card may be increased according to the value included with the received transfer request.

At 720, the credit value at the gaming apparatus is updated according to the received request. For example, if the request represented a request to transfer credit from the smart card to the gaming apparatus, the credit value stored on the gaming apparatus may be increased according to the value included in the received request. As a different example, if the request represented a request to moved credit from the gaming apparatus to the smart card the credit value stored on the gaming apparatus may be decreased according to the amount included in the received request.

In one or more embodiments, the credit balance on the gaming apparatus may be stored and updated in non-volatile memory associated with making secure transactions with smart cards. For example, the credit balance may be stored in memory 144 associated with the SMIB 108 shown in FIG. 1. In this way, a credit balance may be safely maintained during a secure transaction with a smart card, even in the event of a system failure or power outage.

Figure 8:
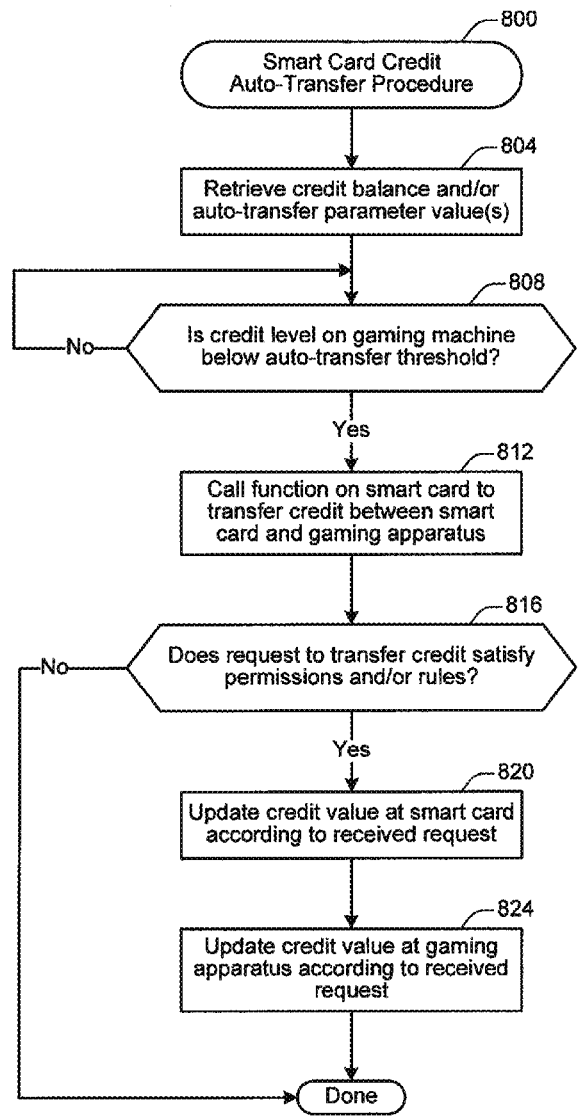
FIG. 8 shows a method 800 for automatically transferring credit to or from a smart card, performed in accordance with one embodiment of the present invention.

FIG. 8 shows a method 800 for automatically transferring credit to or from a smart card, performed in accordance with one embodiment of the present invention. In one or more embodiments, one or more operations associated with the Smart Card Credit Auto Transfer Procedure 800 may be performed using one or more devices in a cashless gaming system. For example, the Smart Card Credit Auto Transfer Procedure 800 may be performed at a gaming machine (e.g., gaming apparatus 104) in communication with a smart card (e.g., via smart card slot 132).

In one or more embodiments, The Smart Card Credit Auto Transfer Procedure 800 may be used to automatically transfer credit from a smart card to a gaming machine. For example, when the credit balance on a gaming machine drops below a predetermined threshold value, the Smart Card Credit Auto Transfer Procedure 800 may operate to automatically transfer credit from the smart card to the gaming machine. In this way, the user of a gaming machine may continue to play a gaming machine with additional credit transferred as needed from the smart card without having to specifically request that funds be transferred from the smart card. In addition, the player need not transfer all of the credit stored on the smart card to the gaming machine at a given time, but rather can maintain a credit balance on the gaming machine appropriate to the player's wishes.

At 804, a credit balance and one or more auto-transfer parameter values are retrieved from the smart card. In one or more embodiments, one or more of these values may be stored in a module on the smart card, such as wallet module 212. A procedure for retrieving one or more such values is described, for example, in relation to the Retrieve Smart Card Parameter Value Procedure 500 illustrated in FIG. 5.

In one or more embodiments, the credit balance retrieved may be measured in U.S. currency. However, in some implementations, the credit balance retrieved may be measured in a different unit, such as casino credits or game credits. For example, the smart card may be designed or configured to store game-specific credits limited to use with one or more specific games.

The one or more auto-transfer parameter values may include, for example, one or more of an auto-transfer threshold value, an auto-transfer amount, and any other parameter values related to an auto-transfer. The auto-transfer threshold value may represent, for example, a threshold value for triggering an auto-transfer of funds from the smart card to the gaming machine. The auto-transfer amount value may represent an amount of credit to transfer to the gaming machine when an auto-transfer of credit is triggered.

In one or more embodiments, one or more of the auto-transfer parameters values may be user-configurable. In this way, a user may configure a smart card to always transfer a certain credit amount to the gaming machine. It is anticipated that such configuration options may be beneficial in encouraging smart card adoption, since many players prefer to add a specific "lucky" amount of credit or cash to a gaming machine each time.

In one or more embodiments, one or more of the auto-transfer parameters values may be system-configurable. For example, different STMs may impose different limits on credit transfer. A low-denomination gaming machine, for instance, may limit the auto-transfer amount to avoid an unreasonable credit transfer (e.g., transferring $1,000 to a penny slot machine).

At 808, a determination is made as to whether the credit level on the gaming machine is below the auto transfer threshold value. According to different embodiments, the determination may be made at different locations and/or by different software programs. In one or more embodiments, the determination may be made by a program running on the CPU 140 of the SMIB 108 illustrated in FIG. 1. In a different embodiment, the determination may be made at a different component of the gaming apparatus (e.g., the master gaming controller). In another embodiment, the determination may be made at the smart card.

At 812, instructions are transmitted to call a function on the smart card to transfer credit between the smart card and the gaming apparatus. In one or more embodiments, the instructions are transmitted to the smart card from a component associated with the gaming apparatus, such as the SMIB 104, via an STM card associated with the gaming apparatus (e.g., an STM card in communication with SIM card slot 136).

According to various embodiments, various techniques may be used to determine the amount of credit to request for transfer. For example, the amount of credit requested for transfer may be determined based on one or more of the auto-transfer amount value, the auto-transfer threshold value, and the current credit balance on the gaming machine. In one or more embodiments, the amount of credit requested for transfer may be sufficient to bring the current credit balance available on the gaming machine up to the sum of the auto-transfer threshold and auto-transfer amount. In some embodiments, the amount of credit requested for transfer may be equivalent (or substantially equivalent) to the auto-transfer amount.

In one or more embodiments, the amount of credit requested for transfer may be limited by the credit balance retrieved from the smart card. For example, the gaming apparatus may not request to transfer more credit than is available on the smart card. Alternately, the gaming apparatus may instead rely on the smart card to transfer the appropriate amount of credit if the amount of credit requested exceeds the credit balance stored on the smart card.

At 816, a determination is made at an application running on the smart card as to whether the request to transfer credit satisfies one or more permissions and/or rules. In one or more embodiments, the determination made at 816 may be substantially similar to the determination made at operation 712 illustrated in FIG. 7.

At 820, when it is determined that the request to transfer credit satisfies one or more permissions and/or rules, the credit value stored on the smart card is updated according to the received transfer request. In one or more embodiments, updating the credit value at the smart card as performed at operation 820 may be substantially similar to operation 716 illustrated in FIG. 7.

At 824, the credit value at the gaming apparatus is updated according to the received request. In one or more embodiments, updating the credit value at the gaming apparatus as performed at operation 824 may be substantially similar to operation 720 illustrated in FIG. 7.

Figure 9:
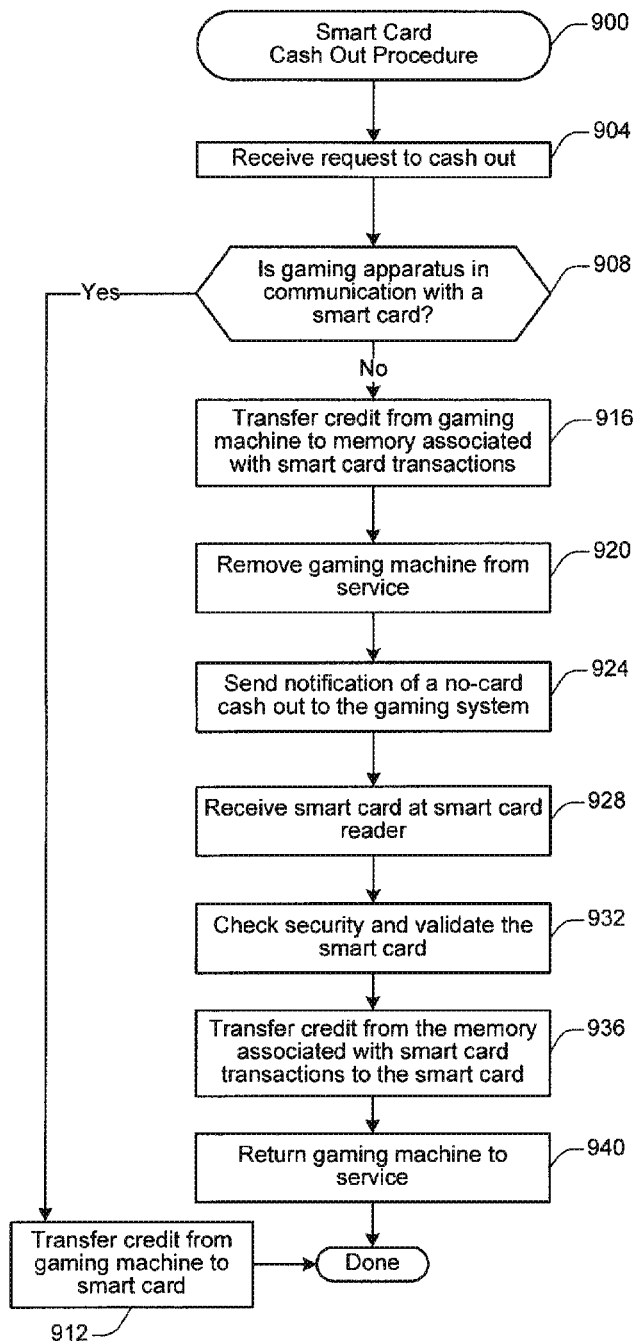
FIG. 9 shows a method 900 for cashing out a smart card, performed in accordance with one embodiment of the present invention.

FIG. 9 shows a method 900 for cashing out a smart card, performed in accordance with one embodiment of the present invention. The Smart Card Cash Out Procedure 900 may be used to move credit stored on a gaming apparatus (e.g., a gaming machine) to a smart card.

Traditionally, a gaming machine may have responded to a request to cash out by providing cash or a ticket directly to a player. However, providing an item of value to the player without supervision from casino personnel may lead to concerns regarding security and/or fraudulent transactions. As discussed herein, providing credit to a player via a smart card may, for example, ensure that one or more gaming transactions are reviewed and/or verified before the player is provided with cash. In addition, using a smart card for cashing out the gaming machine may allow a casino to limit the issuance of physical cash to certain secure locations within a casino (e.g., cashier's terminals). Finally, using a smart card for cashing out the gaming machine may allow paying a player without any use of physical cash. For example, when the player takes the smart card to a cashier, the player could be given a check instead of cash.

However, it is anticipated that some players may initiate play at a gaming machine without having a smart card. In order to permit such play while retaining one or more benefits associated with use of a smart card for cashing out a gaming machine, techniques are described for facilitating cashing out a gaming machine by using a smart card even when the gaming machine is not initially in communication with a smart card.

At 904, a request is received to cash out the gaming machine. According to various embodiments, the request may be received from a gaming machine user, a casino employee, or software and/or hardware associated with the gaming machine. In some instances, the request to cash out received at 904 may represent a request to remove all the cash stored on the smart card. However, in other instances, the request received to cash out at 904 may represent a request to transfer only some of the cash stored on the smart card.

In one or more embodiments, the request to cash out the smart card may be received via user input device 116 illustrated in FIG. 1. For example, the amount of credit stored on the smart card may be displayed via display 120 illustrated in FIG. 1. Then, a user may use the device 116 to request that some or all of the credit stored on the smart card be transferred to the gaming apparatus for purposes of cashing out the smart card.

At 908, a determination is made as to whether the gaming apparatus is in communication with the smart card. For example, one or more components associated with the cashless gaming system 100 illustrated in FIG. 1 may determine whether the gaming apparatus 104 is in communication with a smart card via smart card slot 132.

At 912, when it is determined that the gaming apparatus is in communication with the smart card, credit may be transferred from the gaming machine to the smart card. As discussed herein, various techniques may be used to transfer credits between a gaming machine and a smart card. For example, credit may be transferred from the gaming machine to the smart card using one or more operations described with respect to Smart Card Credit Manual Transfer Procedure 700 illustrated in FIG. 7.

At 916, credit is transferred from the gaming machine to memory associated with smart card transactions. For example, credit may be transferred from the gaming machine to the memory 144 associated with the SMIB 108 illustrated in FIG. 1. In one or more embodiments, the memory associated with smart card transactions may be nonvolatile memory so that if the procedure for cashing out the gaming machine is interrupted (e.g., by a power outage or gaming machine reset), the credit will not be lost.

At 920, the gaming machine is removed from service. Removing the gaming machine from service may involve, for example, placing the gaming machine in a state in which no further wagering or game play may be conducted until the gaming machine is returned to service. In one or more embodiments, certain functionality associated with the gaming machine may remain in operation when the gaming machine is removed from service. For example, the gaming machine may permit continued operation of features related to ordering food and beverages, changing game options, and/or other features that do not directly involve further game play.

At 924, a notification of a no-card cash out is sent to the gaming system. In one or more embodiments, the notification of a no-card cash out may be sent over the gaming network (e.g., via communication link 124 illustrated in FIG. 1). In addition, or alternately, the notification of a no-card cash out may be provided at the gaming machine. For example, one or more audible and/or visible alarms may be activated (e.g., a gaming machine candle may be lit). In some implementations, the notification of a no-card cash out may be used to attract the attention of casino personnel. For example, casino personnel may see that a player without a smart card would like to cash out a gaming machine and respond by bringing a new smart card to the player.

At 928, a smart card is received at the smart card reader. For example, the smart card may be received at smart card reader 132 illustrated in FIG. 1. In one or more embodiments, the smart card may be brought by a casino employee to the gaming machine. In some embodiments, the smart card may be supplied automatically by a device associated with the cashless gaming network. For example, the gaming machine may be coupled with a device configured to supply a new smart card to a player if the player does not already possess a smart card. Either the player or the casino employee may insert the smart card into the smart card reader.

In one or more embodiments, the smart card may be an unregistered or "day use" smart card (e.g., Unregistered Smart Card 200 illustrated in FIG. 2). However, in some embodiments the smart card may be registered to the player (e.g., Registered Smart Card 300 illustrated in FIG. 3). For example, a casino employee who provides a smart card to the player may use a portable handheld device to register the smart card for the player. As another example, a device at the gaming machine capable of providing a new smart card to the user may also be capable of performing one or more smart card registration operations (e.g., with supervision by a casino employee, by providing a source of identification information such as a credit card, etc.).

At 932, security is checked and the smart card is validated. In one or more embodiments, the operations performed for checking security and validating the smart card may be substantially similar to authentication operations performed whenever a smart card is inserted into the smart card reader. For example, one or more operations may be performed that are related to establishing a secure communication session, authenticating the smart card with one or more remote servers, determining whether to permit offline use of the smart card, etc.

At 936, credit is transferred from the memory associated with smart card transactions to the smart card. For example, the credit may be transferred from memory 144 to a smart card in communication with smart card slot 132. In one or more embodiments, one or more operations performed in conjunction with transferring credit to the smart card may be substantially similar to operations discussed in relation to Smart Card Credit Manual Transfer Procedure 700 illustrated in FIG. 7.

At 940, the gaming machine is returned to service. In one or more embodiments, the gaming machine may be returned to service automatically once one or more operations associated with cashing out the gaming machine are completed. However, in some embodiments, the gaming machine may remain out of service until a casino employee (e.g., an employee who provided the smart card) provides input to the gaming machine. For example, the casino employee may supply a digital and/or physical key to return the gaming machine to service.

In one or more embodiments, one or more of the operations illustrated in FIG. 9 may be omitted. For example, credit may be moved directly from the gaming machine to the smart card without separately transferring credit to memory specifically associated with smart card transactions. As another example, separate operations for checking security and validating the smart card may be unnecessary if the new smart card is provided by the gaming machine.

In one or more embodiments, one or more operations illustrated in FIG. 9 may be performed in a different order and/or concurrently. For example, the gaming machine may be removed from service before transferring credit from the gaming machine to memory associated with smart card transactions. As another example, a notification of a no-card cash out may be transmitted immediately upon making a determination at 908 that the gaming machine is not in communication with the smart card.

Figure 10:
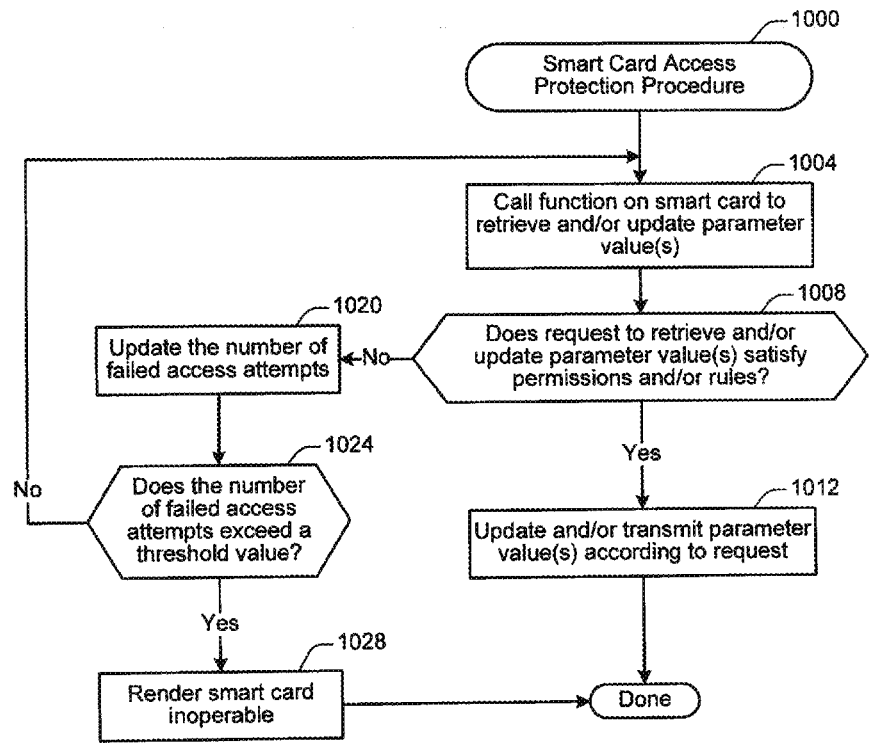
FIG. 10 shows a method 1000 for protecting smart card access, performed in accordance with one embodiment of the present invention.

FIG. 10 shows a method 1000 for protecting smart card access, performed in accordance with one embodiment of the present invention. The Smart Card Access Protection Procedure 1000 may be performed at via one or more devices in a cashless gaming system in communication with a smart card. For example, the Smart Card Access Protection Procedure 1000 may be performed at gaming apparatus 104 in communication with a smart card via smart card slot 132.

The Smart Card Access Protection procedure 1000 may be used to render the smart card at least partially inoperable in response to repeated failed access attempts. For example, if retrieving and/or updating one or more values stored on the smart card requires that the user supply the correct PIN, and the user repeatedly supplies incorrect PINs, then the smart card may be rendered at least partially inoperable. As another example, if one or more values stored on the smart card may only be retrieved and/or updated from one or more specific types of gaming apparatuses, and repeated access attempts are made from one or more gaming apparatuses that do not have permission to retrieve and/or update the one or more values, the smart card may be rendered at least partially inoperable.

By rendering the smart card at least partially inoperable, an attacker may be prevented from altering one or more parameter values on the smart card in order to compromise the security of the smart card. In addition, an attacker may be prevented from moving funds off of the smart card.

In one or more embodiments, one or more parameter values stored on the smart card may be read, but not updated, after the smart card is rendered inoperable. This may allow a user to take the smart card to a terminal and/or casino employee for further assistance. For example, the user may provide identification information to casino personnel and/or a cashless gaming apparatus to verify the user's identity if the user has lost or forgotten the PIN or other security information stored on the smart card. Then, one or more cash out procedures may be performed. Alternately, or additionally, the user may be issued a new smart card to replace the inoperable smart card.

At 1004, instructions are transmitted from the cashless gaming apparatus to the smart card to call a function on the smart card to retrieve and/or update one or more parameter values. At 1008, a determination is made as to whether the request to retrieve and/or update one or more parameter values satisfies one or more permissions and/or rules. At 1012, when it is determined that the request to retrieve and/or update one or more parameter values satisfies the permissions and/or rules, the one or more parameter values are transmitted from the smart card to the gaming machine and/or updated on the smart card. In one or more embodiments, operations 1004, 1008, and/or 1012 may be substantially similar to operations 504, 508, and/or 512 illustrated in FIG. 5 and/or operations 604, 608, and/or 612 illustrated in FIG. 6.

At 1020, when it is determined that the request to retrieve and/or update one or more parameter values does not satisfy the permissions and/or rules, the number of failed access attempts is updated. In one or more embodiments, the number of failed access attempts may be stored on the smart card. For example, the number of failed access attempts may be a parameter value stored in the security module 208 illustrated in FIG. 2 on the smart card.

Additionally, or alternately, the number of failed access attempts may be stored at one or more remote servers, such as host systems 124 illustrated in FIG. 1. For example, the smart card may transmit information associated with failed access attempts to host systems 124 when the smart card authenticates with the host systems.

Additionally, or alternately, the number of failed access attempts may be transmitted from the smart card to the gaming apparatus. Transmitting the number of failed access attempts to the gaming apparatus may allow, for example, a user to be informed of the risk that the smart card will be rendered inoperable. This may allow the user to request assistance from casino personnel (e.g., at a patron management terminal and/or cashier's terminal) instead of taking further action that may risk invalidating the smart card. For example, a user may have forgotten the PIN stored on the card and may be attempting to guess the PIN value.

In one or more embodiments, updating the number of failed access attempts may include updating information based on a time period or time stamp associated with previous failed access attempts. For example, each failed access attempt may be associated with a time stamp. In some instances, failed access attempts that occurred in the past (e.g., more than 2 hours ago), may be removed.

In one or more embodiments, the smart card, remote servers, and/or gaming apparatus may maintain more than one parameter values associated with the number of failed access attempts. For example, one parameter value may be associated with failed access attempts to high security features, such as removing funds from the smart card, while another parameter value may be associated with failed access attempts to low security features, such as changing a preferred language. Thus, in some implementations it may be possible to track failed access attempts without unnecessarily rendering the smart card inoperable.

At 1024, a determination is made as to whether the number of failed access attempts exceeds a threshold value. In one or more embodiments, the determination is made on the smart card. For example, the security module 108 illustrated in FIG. 1 may make the determination.

The threshold value may represent a maximum number of failed access attempts before the smart card is rendered inoperable. In one or more embodiments, the threshold value may be stored on the smart card, for example in the security module 108. Alternately, or additionally, a threshold value may be stored on the STM.

According to various embodiments, different threshold values may be used. In one or more embodiments, the threshold value is five failed access attempts since the most recent successful smart card use. However, in different embodiments, the threshold value may be anywhere between 1 and 100.

In one or more embodiments, the threshold value may be updated upon request by one or more devices in the cashless gaming. For example, the threshold value may be updated upon authentication of the smart card with host systems 124 illustrated in FIG. 1. This may allow a casino to tailor the security provided by the smart card to the specific needs of the casino and/or particular users or groups of users. For example, a smart card that holds a relatively high credit balance may be assigned a relatively low failed access attempt threshold value, while a smart card that holds a relatively low credit balance may be assigned a relatively high failed access attempt threshold value. As another example, a user may request to raise or lower the failed access attempt threshold value.

In one or more embodiments, the smart card may store different threshold values for different types of failed access attempts. For example, the smart card may store a first failed access attempt threshold value for high security access attempts, such as attempts to remove credits from the smart card, and a second failed access attempt threshold value for low security access attempts, such as attempts to change a preferred language.

In one or more embodiments, one or more failed access attempt threshold values may include information related to a time period or timeout. For example, a smart card may be rendered inoperable only when the number of failed access attempts exceeds a certain threshold value (e.g., three attempts) in a certain period of time (e.g., 2 hours). In this way, a smart card will not be rendered inoperable based on failed access attempts spaced far apart in time.

At 1028, when it is determined that the number of failed access attempts exceeds a threshold value, the smart card is rendered at least partially inoperable. In one or more embodiments, rendering the smart card inoperable may include performing at least one operation to physically prevent further updating of all or some parameter values stored on the card. For example, one or more circuits and/or communication interfaces may be fused or broken. As another example, a card may be broken, punched, bent, melted, or otherwise damaged or destroyed to render it inoperable.

In one or more embodiments, rendering the smart card inoperable may include performing at least one software operation to prevent further updating of the smart card. For example, one or more modules or applets running on the smart card may store a value in memory that indicates that no further updating of parameter values may be performed.

In one or more embodiments, information may be retrievable from the smart card by casino employees or systems once the smart card is rendered inoperable. For example, the player may be able to take the smart card to a service desk and provide confirmation of identity. The credit balance then may be retrieved and compared against a verified credit balance stored in the casino systems.

If the two values match, the player may be permitted to cash out the balance or transfer the balance to a new smart card. Acquiring a new smart card may require paying a fee (e.g., $5 or $10) and interacting with casino employees or systems. Thus, if a player repeatedly requires a new smart card, the player may incur costs and/or come to the attention of casino employees or systems. In this way, casinos may monitor and prevent attempts to tamper with or gain unauthorized access to smart cards in the cashless gaming system.

If instead the credit value stored on the smart card does not match the value stored in the casino systems, then the casino may investigate the cause of the discrepancy (e.g., systems failures, unauthorized smart card access, etc.). The casino can then make an operational decision about whether to allow the player to cash out the smart card and what the value of the cash out should be. In this way, the casino may be able to access at least some credit balance information even in the event of total system failure.

Figure 11:
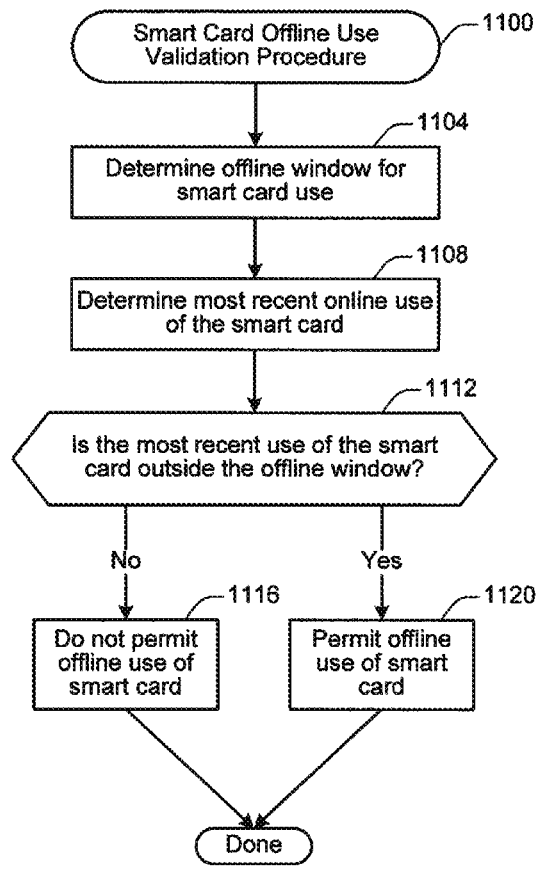
FIG. 11 shows a method 1100 for validating offline use of a smart card, performed in accordance with one embodiment of the present invention.

FIG. 11 shows a method 1100 for facilitating offline use of a smart card, performed in accordance with one embodiment of the present invention.

It is anticipated that in some instances, a player may attempt to use a smart card at a gaming apparatus (e.g., a gaming machine) that is not in communication with a cashless gaming server. For example, communications between the gaming machine and one or more cashless gaming servers may be temporarily disrupted. In some instances, communications may be temporarily disrupted due to network failure, network congestion, routine maintenance, etc. As another example, it may be desirable to permit use of the smart card without requiring communication between the gaming machine and one or more cashless gaming servers. In some instances, permitting use of the smart card without requiring authentication with one or more cashless gaming servers may help avoid network congestion, reduce usage of server resources, etc.

In one or more embodiments, offline smart card use may be facilitated by maintaining a record of when a smart card was last authenticated. Then, the cashless gaming system can ensure that a smart card that has not been recently authenticated is authenticated before further use of the smart card is permitted. Thus, the cashless gaming system may permit offline use of the smart card while ensuring that the smart card is at least occasionally authenticated with one or more cashless gaming servers. The Smart Card Offline Use Validation Procedure 1100 illustrated in FIG. 11 is one example of how offline use of the smart card may be facilitated.

At 1104, the offline window for smart card use is determined. As discussed herein, the offline window may represent, for example, a length of time between the last authenticated use of a specific smart card and the time in which it must be authenticated again before it can be used further. In one or more embodiments, the offline window is 24 hours, which means that if a given smart card has been authenticated with a remote cashless gaming server at a particular time (e.g., during use for a cashless gaming session), that smart card may be used for 24 hours without requiring that the smart card be authenticated again with a remote cashless gaming server. In this way, a player may continue to use a smart card even if remote authentication of the card is not performed.

Configuring the offline window may provide a casino with additional control over security in the cashless gaming system. Thus, according to various embodiments, the offline window may be determined in various ways. In one or more embodiments, the offline window may be a value stored on an STM card in communication with the gaming apparatus. For example, the offline window may be stored on an STM card in communication with SIM card slot 136 illustrated in FIG. 1. In some embodiments, the offline window may be a value stored on the smart card. For example, the offline window may be stored in wallet module 312 illustrated in FIG. 3. In some embodiments, the offline window may be determined dynamically, and/or various offline windows may be used. For example, the gaming machine may read a credit balance stored on the smart card and provide a shortened offline window for a card carrying a relatively high balance than for a card storing a relatively low credit balance.

At 1108, the time of the most recent online use of the smart card may be determined. In some embodiments, the most recent online use of the smart card may be the most recent time in which the smart card has been authenticated with one or more remote servers associated with the cashless gaming system (e.g., host systems 124 illustrated in FIG. 1). Authentication of the smart card with the one or more remote servers may involve, for example, communication between the smart card and the remote servers to verify that the smart card is intact and has not been tampered with. In addition, or alternately, information related to one or more offline cashless gaming transactions performed using the smart card may be transmitted to the one or more remote servers for verification. For example, information stored on the smart card related to cashless transactions may be transmitted to the one or more remote servers and compared with transaction information received from other devices in the cashless gaming system (e.g., one or more gaming apparatuses associated with the cashless transactions). In this way, cashless transactions performed during offline use of the smart card may be at least periodically verified.

In one or more embodiments, determination of the time of the most recent online use of the smart card may include reading one or more values stored on the smart card. For example, when a smart card is authenticated with one or more remote servers, the one or more remote servers may provide an encrypted token to the smart card (e.g., encrypted with a private key) verifying that the smart card has been authenticated. Then, the smart card may provide this token to the gaming apparatus, which can verify that the token was provided by the one or more remote servers (e.g., by decrypting with the corresponding public key).

At 1112, a determination is made as to whether the most recent online use of the smart card is outside the offline window. The determination may be made by comparing the offline window identified in operation 1104 to the most recent online use of the smart card identified in operation 1108.

At 1116, when it is determined that the last online use of the smart card is outside the offline window, one or more operations related to offline use of the smart card is not permitted. For example, if the smart card has not been validated with the remote server for a period of 3 days, and the window for offline use is 24 hours, offline use of the smart card may not be permitted. In one or more embodiments, no further use of the smart card will be permitted until the smart card is authenticated. However, in some embodiments, certain limited uses of the smart card may be permitted. For example, low security operations such as changing the preferred language stored on the smart card may be permitted. As another example, the player may be permitted to finish a partially completed transaction, such as moving credit from a gaming machine to a smart card.

If the gaming apparatus is in communication with one or more cashless gaming servers, the gaming apparatus may automatically initiate communications with the one or more cashless gaming servers for authenticating the smart card. Alternately, or additionally, the gaming apparatus may inform the player that the smart card must be authenticated before further use and/or request that the card be authenticated.

At 1120, when it is determined that the most recent online use of the smart card is inside the offline window, one or more operations related to offline use of the smart card may be permitted. For example, if the offline window is 24 hours, but the smart card was last authenticated 5 hours ago, offline use of the smart card may be permitted.

In some implementations, when the smart card is used in an offline cashless gaming transaction, information related to the cashless gaming transaction may be stored both on the smart card and on the gaming apparatus for later verification (e.g., before cashing out the smart card). In this way, a casino may permit offline use of the smart card while ensuring that the offline transactions are legitimate before providing actual money based on the offline transactions.

Figure 12:
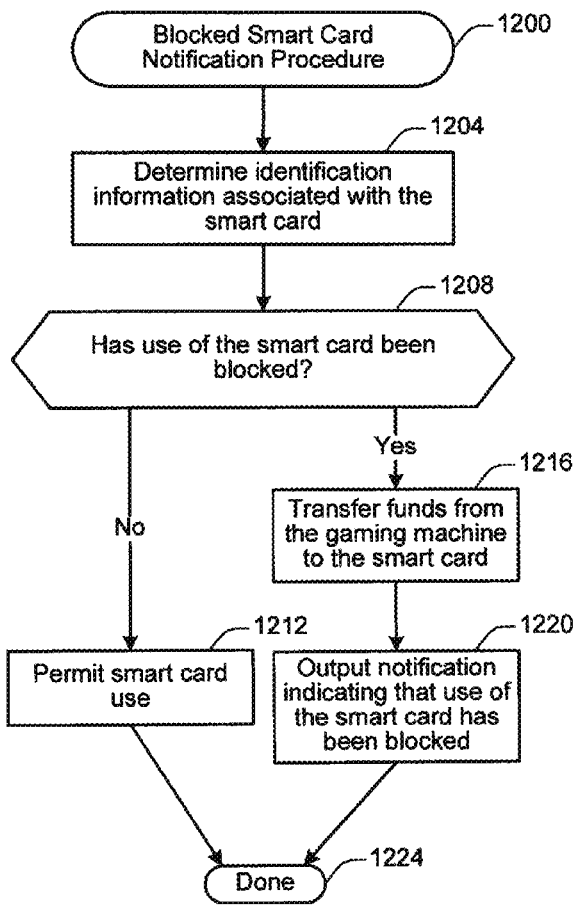
FIG. 12 shows a method 1200 for transmitting a notification regarding a blocked smart card, performed in accordance with one embodiment of the present invention.

FIG. 12 shows a method 1200 for transmitting a notification regarding a blocked smart card, performed in accordance with one embodiment of the present invention.

In one or more embodiments, the Blocked Smart Card Notification Procedure 1200 may be performed at various devices (e.g., gaming apparatus 104 illustrated in FIG. 1) in communication with a smart card in a cashless gaming system. For example, the Blocked Smart Card Notification Procedure 1200 may be performed at a gaming machine.

The Blocked Smart Card Notification Procedure 1200 may be performed in conjunction with one or more additional procedures associated with use of the smart card. For example, the Blocked Smart Card Notification Procedure 1200 may be performed before one or more of the procedures illustrated in FIGS. 5-11 and 13.

In one or more embodiments, the blocked smart card notification procedure may be used to protect against unauthorized use of a smart card (e.g., a smart card that has been lost or stolen). As another example, the blocked smart card notification procedure 1200 may be used to protect against errors in the case of mismatched smart cards and/or transfer errors.

At 1204, identification information associated with the smart card is determined. According to various embodiments, the identification information may include any information that may be used to identify the smart card and/or the user associated with the smart card. For example, the identification may include one or more serial numbers, PINs, player identification numbers, cryptographic keys, etc.

In one or more embodiments, the identification information associated with the smart card may be determined by retrieving one or more values stored on the smart card. For example, one or more values may be retrieved using the Retrieve Smart Card Parameter Value Procedure 500 illustrated in FIG. 5. As a different example, known information regarding the smart card, such as the smart card serial number, may be transmitted to one or more remote servers (e.g., host systems 124 illustrated in FIG. 1) to retrieve additional identification information.

At 1208, a determination is made as to whether the smart card has been blocked. In one or more embodiments, the determination as to whether the smart card has been blocked may be made at the gaming apparatus (e.g., at SMIB 108 illustrated in FIG. 1). In some instances, a gaming apparatus may store information used to identify blocked smart cards. For example, a gaming apparatus may periodically receive a list of blocked smart cards from one or more remote servers. In this way, it may be possible to prevent even certain offline uses of blocked smart cards. Additionally, and/or alternately, a gaming apparatus may directly query one or more remote servers to determine whether a particular smart card has been blocked. In this case, the determination made at 1208 may be made at either the server or at the gaming apparatus.

At 1212, when it is determined that the smart card has not been blocked, continued the use of the smart card for cashless gaming may be permitted. For example, funds may be transmitted between the smart card and the gaming apparatus, one or more parameter values stored on the smart card may be retrieved and/or updated, and/or other operations associated with the smart card use may be performed.

At 1216, if instead it is determined that use of the smart card has been blocked, credit is transferred from the gaming apparatus to the smart card. In one or more embodiments, credits may transferred from the gaming apparatus to the smart card using, for example, one or more operations associated with Smart Card Credit Manual Transfer Procedure 700 illustrated in FIG. 7. In a different embodiment, one or more different techniques may be used for transferring funds to a blocked smart card.

At 1220, a notification indicating that the smart card has been blocked is output. According to various embodiments, the notification may be output via one or more audible and/or visible indicators at the gaming apparatus. For example, the user may be presented with a message on a display (e.g., display 120 illustrated in FIG. 1) indicating that the smart card has been blocked. As another example, a flash light and/or audible alarm may be activated.

In one or more embodiments, the notification may include one or more instructions. For example, the notification may instruct the user to take the smart card to a different location in the gaming environment, such as a cashier's terminal. In this way, the condition that gave rise to the blocking of the smart card may be resolved. For example, a casino employee may examine one or more transaction records to reconcile or correct a credit transfer error.

In one or more embodiments, notification may be transmitted to one or more casino systems and/or casino employees. For example, notification may be transmitted by an audible and/or visible alarm at the gaming machine. In this way, casino personnel may be notified of a blocked smart card and come to the assistance of the player. As another example, notification may be transmitted over a network. If the smart card was blocked because it reported was lost or stolen, one or more casino employees and/or systems may be notified so that the actual status of the smart card maybe verified. In such instances, a notification indicating that the smart card has been blocked may not be output directly to the user. This may allow casino security to receive the notification and/or direct personnel to identify the user of the blocked smart card.

Figure 13:
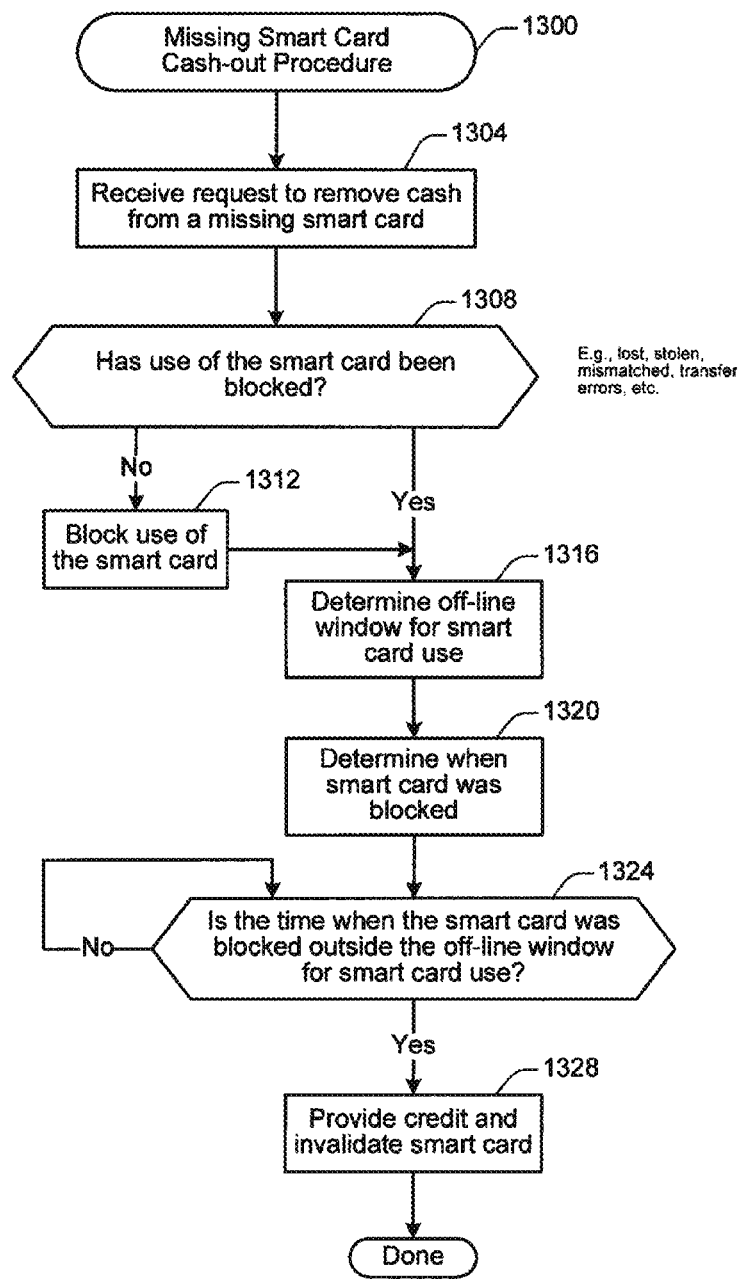
FIG. 13 shows a method 1300 for cashing out a missing smart card, performed in accordance with one embodiment of the present invention.

FIG. 13 shows a method 1300 for cashing out a missing smart card, performed in accordance with one embodiment of the present invention. In one or more embodiments, missing smart card cash out procedure 1300 may be used to retrieve stored on a smart card that is lost, stolen, or otherwise missing. For example, a user who notices that their smart card is missing may report the loss to one or more casino employees and/or systems (e.g., at a patron management and/or cashier's terminal). Then, the Missing Smart Card Cash Out Procedure 1300 may be used to insure that all transactions completed using the missing smart card have been recorded and/or verified before transferring credit stored on the smart card.

At 1304, a request is received to remove cash from the missing smart card. For example, the request may be received by one or more of the user, the cashier, and/or a program associated with cashless gaming. In one or more embodiments, a request was received at a cashier's terminal.

At 1308, a determination is made as to whether the use of the smart card has been blocked. In one or more embodiments, the determination made at 1308 may be substantially similar to the operations described with respect to reference number 1208 illustrated in FIG. 12.

At 1312, if it is determined that the smart card has not been blocked, use of the smart card may be blocked. In one or more embodiments, the use of the smart card is blocked by transmitting instructions to one or more remote servers associated with cashless gaming. In this way, further use of the smart card for cashless gaming may be prevented until the status of the smart card may be determined.

In one or more embodiments, the instructions transmitted to the one or more remote servers may include identification information associated with the player making the request to remove cash from the missing smart card. The information may include personal identification information, such as name, date of birth, address, or any other type of information. Collecting and transmitting such information may assist in preventing players from making fraudulent requests to remove cash from smart cards (e.g., smart cards that are not their own).

At 1316, when it is determined that use of the smart card has been blocked, the offline window for smart card is determined. In at least one embodiments, determining the offline window for smart card use as illustrated at 1316 may be substantially similar to operation 1104 illustrated in FIG. 11.

At 1320, a determination is made as to when the smart card was blocked. In one or more embodiments, the determination as to whether the smart card was blocked may be made by transmitting a request to one or more remote systems, such as host systems 124 illustrated in FIG. 1. Additionally, and/or alternately, the gaming apparatus may maintain a list of blocked smart cards transmitted periodically from one or more remote servers, along with time stamps indicating when each card was blocked.

At 1324, a determination is made as to whether the time when the smart card was blocked falls outside the offline window associated with the smart card. The determination may be made by comparing the offline window identified in operation 1316 to the time at which use of the smart card was blocked as determined at operation 1320.

At 1328, when it is determined that the time in which the smart card was blocked falls outside the offline window for smart card use, one or more operations may be performed for cashing out and invalidating the smart card. For example, the player may be provided with actual cash corresponding to a verified balance stored on the smart card. As another example, the player may be provided with a new smart card storing a credit balance. In addition, or alternately, further use of the blocked smart card may be permanently prevented.

In some instances, a smart card may become blocked by the cashless gaming system due to a mismatch between one or more balances or transaction records stored on the smart card and one or more balances or transactions records stored at a cashless gaming server. Such a mismatch may occur, for instance, if gaming machine electronics became permanently disabled before a transaction could be transmitted to the server. Accordingly, a cashless gaming system may enforce security policies to handle mismatches.

For example, one security policy may be that a user (e.g., a casino employee) cannot permanently clear a system block (e.g., due to a mismatch in the transaction records). Thus, a casino employee with appropriate security clearances may be able to access information stored on a block smart card. However, the smart card may remain blocked until the system block is cleared by the cashless gaming system itself, for example by reconciling the mismatched transaction records.

As another example, one security policy may be that writing to a card to modify the transaction record is prohibited by the system and/or physically impossible. If there is a transaction recorded in the database but not on a smart card, for instance, then it is likely that the smart card either is malfunctioning or has been tampered with. In such a scenario, a casino may choose to issue a new card, but the mismatched card may remain blocked and unaltered in order to retain a clear record of any transactions. Additionally, or alternately, a casino employee (e.g., a cashier) may read the last known balance from the database and/or smart card and make an operational choice as to the amount of funds to provide the player upon cash-out.

As yet another example, one security policy may be that only certain casino personnel (e.g., supervisors) have permission to modify a transaction database at a cashless gaming server. The casino may know, for instance, that a specific slot machine overloaded and became inoperable. Therefore, the casino may choose to honor transactions that were stored on the smart card but not recorded on the cashless gaming server. This may be accomplished by manually modifying the transactions database on the cashless gaming server to match the transaction record on the smart card.

Gaming Machine

Figure 14:
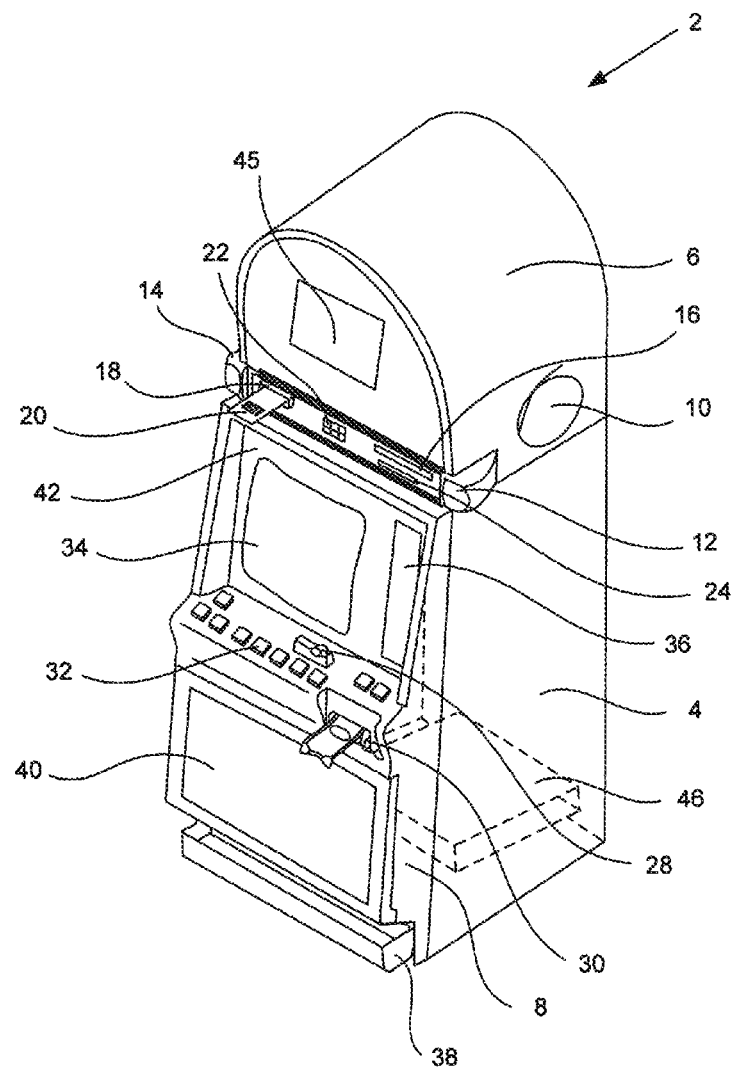
FIG. 14 shows a perspective view of a gaming machine 2, constructed in accordance with one embodiment of the present invention.

FIG. 14 shows a perspective view of a gaming machine 2, constructed in accordance with one embodiment of the present invention. The gaming devices and gaming functions described with respect to at least FIG. 14 may be incorporated as components of the ECI's described above with respect to at least FIGS. 1 thru 5B and 9A-9D. Further, the gaming devices may be operated in accordance with instructions received from a remote host in communication with the gaming machine. In some instance, a host-controlled process executed on the gaming machine may share a gaming device with a process controlled by the master gaming controller 46 on the gaming machine.

As illustrated in the example of FIG. 14, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28 and a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above.

In one embodiment attached to the main door are a plurality of player-input switches or buttons 32. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with the present invention are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port or a key pad.

As seen in FIG. 14, viewable through the main door is a video display monitor 34 and an information panel 36. The display monitor 34 will typically be a cathode ray tube, high resolution flat-panel LCD, SED based-display, plasma display, a television display, a display based on light emitting diodes (LED), a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. The master gaming controller 46 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Games Played

Many different types of games, including mechanical slot games, video slot games, video poker, video black jack, video pachinko and lottery, may be provided with gaming machines of this present invention. In particular, the gaming machine 2 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the remote host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(es) of one or more of the gaming machines. In operation, the remote host is operable to communicate one or more of the stored game programs to at least one local gaming machine processor. In different embodiments, the stored game programs are communicated or delivered by embedding the communicated game program in a device or a component (e.g., a microchip to be inserted in a gaming machine), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the remote host communicating data to the gaming device regarding an upcoming tournament or promotion or any other suitable trigger. After the stored game programs are communicated from the remote host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine.

In one embodiment, the various games available for play on the gaming machine 2 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, pay-table data or information and applicable game rules that relate to the play of the gaming machine. In another embodiment, the games available for play on the gaming machine may be generated on a remote gaming device but then displayed on the gaming machine.

In one embodiment, the gaming machine 2 may execute game software, such as but not limited to video streaming software that enables the game to be displayed on the gaming machine. When a game is stored on the gaming machine 2, it may be loaded from the mass storage device into a RAM for execution. In some cases, after a selection of a game, the game software that enables the selected game to be generated may be downloaded from a remote gaming device, such as another gaming machine.

As illustrated in the example of FIG. 14, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 (e.g., a video LCD display) for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 14. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others may have multiple displays.

Networks

In various embodiments, the remote gaming device may be connected to the host computer via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site remote host as in, for example, a gaming establishment or a portion of a gaming establishment. In another embodiment, the data network is a wide area network (WAN) in which one or more of the gaming machines are in communication with at least one off-site remote host. In this embodiment, the plurality of gaming machines may be located in a different part of the gaming establishment or within a different gaming establishment than the off-site remote host. Thus, the WAN may include an off-site remote host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. In addition, various combinations of gaming devices are possible on the gaming machine. For example, some gaming machine only accept cash, cashless vouchers or electronic fund transfers and do not include coin acceptors or coin hoppers. Thus, those of skill in the art will understand that the present invention, as described below, can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

Gaming Machine vs. General-Purpose Computer

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

In particular embodiments, a state of a gaming device may be reconstructed from game history information stored in multiple locations. For instance, in one embodiment, a gaming device operable to provide an ECI and a game interface simultaneously may not store state information for the ECI but only for the game interface. Thus, to reconstruct the state of gaming device including the ECI in a dispute, after a malfunction or after a power-failure, game history information may have to be retrieved from a local memory source on the gaming device and a remote memory source located on a remote host that provides the ECL. For example, the remote and gaming machine may store correlation information, such as timing information or referential information, that allows events on the gaming machine to be correlated to events occurring on the remote host. The correlation information stored at the gaming machine and/or remote host may be used to synchronize the reconstruction of a game state on the gaming machine. In a particular embodiment, a remote host that provides ECI services to a gaming device may provide an ECI that allows archival information regarding ECIs displayed on a gaming device to be retrieved.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In one or more embodiments, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Game Play

Returning to the example of FIG. 14, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel×3 symbols on the second reel×3 symbols on the third reel). A four reel gaming machine with three symbols generated in active symbol positions on each reel includes 81 ways to win (i.e., 3 symbols on the first reel×3 symbols on the second reel×3 symbols on the third reel×3 symbols on the fourth reel). A five reel gaming machine with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play.

In another embodiment, the gaming machine processor or remote host randomly provides the player one or more plays of one or more secondary games. In one such embodiment, the gaming machine does not provide any apparent reasons to the player for qualifying to play a secondary or bonus game. In this embodiment, qualifying for a bonus game is not triggered by an event in or based specifically on any of the plays of any primary game. That is, the gaming machine may simply qualify a player to play a secondary game without any explanation or alternatively with simple explanations. In another embodiment, the gaming machine (or remote host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Gaming System Components

Figure 15:
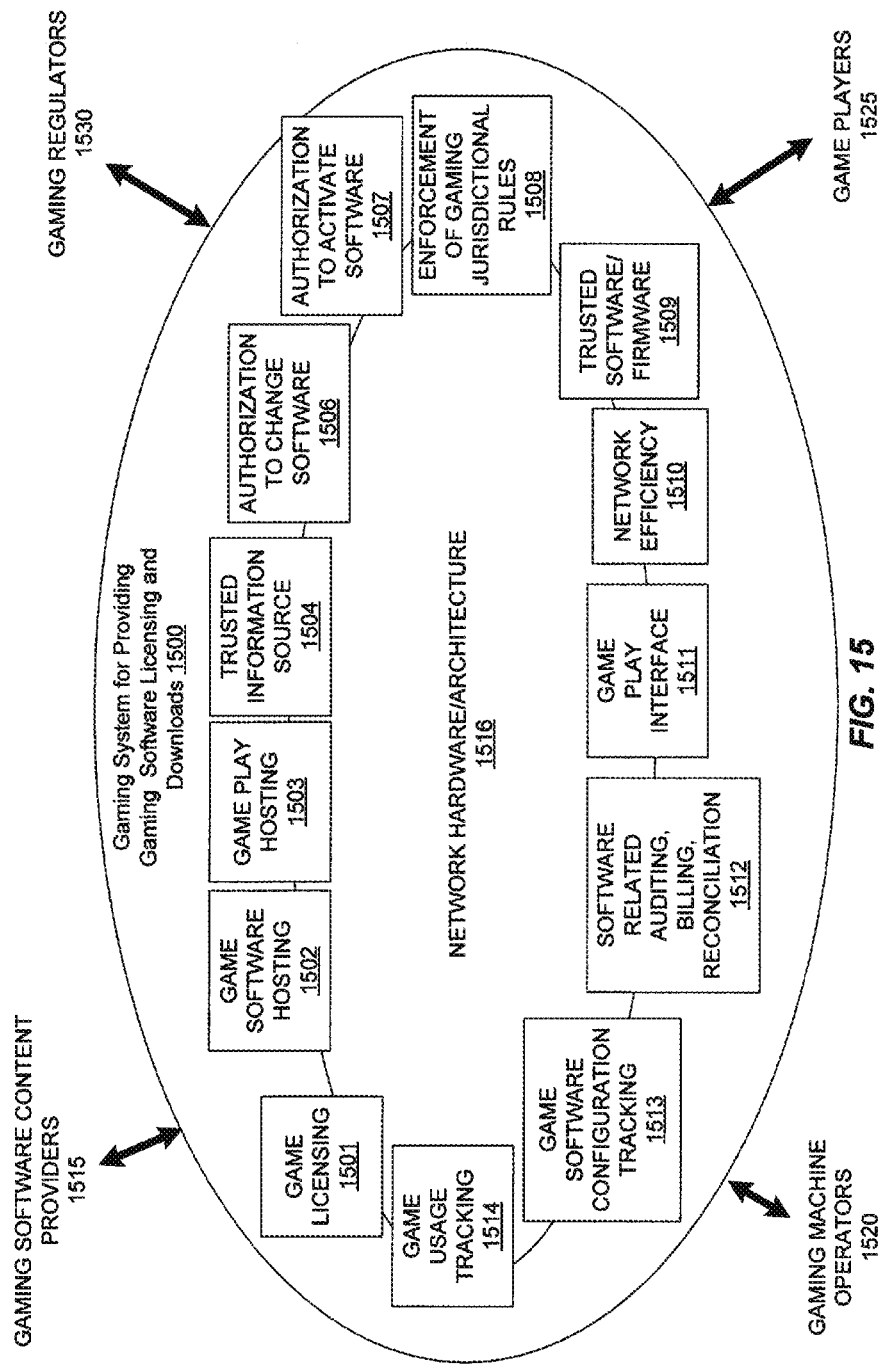
FIG. 15 shows a block diagram illustrating components of a gaming system 1500, which may be used for implementing one or more embodiments of the present invention.

FIG. 15 shows a block diagram illustrating components of a gaming system 1500 which may be used for implementing one or more embodiments of the present invention. In FIG. 15, the components of a gaming system 1500 for providing game software licensing and downloads are described functionally. The described functions may be instantiated in hardware, firmware and/or software and executed on a suitable device. In the system 1500, there may be many instances of the same function, such as multiple game play interfaces 1511. Nevertheless, in FIG. 15, only one instance of each function is shown. The functions of the components may be combined. For example, a single device may comprise the game play interface 1511 and include trusted memory devices or sources 1509. The described components and their functions may be incorporated in various embodiments of the cashless gaming systems, devices, and techniques described herein.

The gaming system 1500 may receive inputs from different groups/entities and output various services and/or information to these groups/entities. For example, game players 1525 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 1500, receive revenue for the use of their software and compensate the gaming machine operators. The gaming regulators 1530 may provide rules and regulations that must be applied to the gaming system and may receive reports and other information confirming that rules are being obeyed.

In the following paragraphs, details of each component and some of the interactions between the components are described with respect to FIG. 15. The game software license host 1501 may be a server connected to a number of remote gaming devices that provides licensing services to the remote gaming devices. For example, in other embodiments, the license host 1501 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 1515 may track the usage of game software on a plurality of devices in communication with the host. The game usage-tracking host 1515 may be in communication with a plurality of game play hosts and gaming machines. From the game play hosts and gaming machines, the game usage tracking host 1515 may receive updates of an amount that each game available for play on the devices has been played and on amount that has been wagered per game. This information may be stored in a database and used for billing according to methods described in a utility based licensing agreement.

The game software host 1502 may provide game software downloads, such as downloads of game software or game firmware, to various devious in the game system 1500. For example, when the software to generate the game is not available on the game play interface 1511, the game software host 1502 may download software to generate a selected game of chance played on the game play interface. Further, the game software host 1502 may download new game content to a plurality of gaming machines via a request from a gaming machine operator.

In one embodiment, the game software host 1502 may also be a game software configuration-tracking host 1513. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 1503 may be a host server connected to a plurality of remote clients that generates games of chance that are displayed on a plurality of remote game play interfaces 1511. For example, the game play host device 1503 may be a server that provides central determination for a bingo game play played on a plurality of connected game play interfaces 1511. As another example, the game play host device 1503 may generate games of chance, such as slot games or video card games, for display on a remote client. A game player using the remote client may be able to select from a number of games that are provided on the client by the host device 1503. The game play host device 1503 may receive game software management services, such as receiving downloads of new game software, from the game software host 1502 and may receive game software licensing services, such as the granting or renewing of software licenses for software executed on the device 1503, from the game license host 1501.

In particular embodiments, the game play interfaces or other gaming devices in the gaming system 1500 may be portable devices, such as electronic tokens, cell phones, smart cards, tablet PC's and PDA's. The portable devices may support wireless communications and thus, may be referred to as wireless mobile devices. The network hardware architecture 1516 may be enabled to support communications between wireless mobile devices and other gaming devices in gaming system. In one embodiment, the wireless mobile devices may be used to play games of chance.

The gaming system 1500 may use a number of trusted information sources. Trusted information sources 1504 may be devices, such as servers, that provide information used to authenticate/activate other pieces of information. CRC values used to authenticate software, license tokens used to enable the use of software or product activation codes used to activate to software are examples of trusted information that might be provided from a trusted information source 1504. Trusted information sources may be a memory device, such as an EPROM, that includes trusted information used to authenticate other information. For example, a game play interface 1511 may store a private encryption key in a trusted memory device that is used in a private key-public key encryption scheme to authenticate information from another gaming device.

When a trusted information source 1504 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 1500 of the present invention may include devices 1506 that provide authorization to download software from a first device to a second device and devices 1507 that provide activation codes or information that enable downloaded software to be activated. The devices, 1506 and 1507, may be remote servers and may also be trusted information sources. One example of a method of providing product activation codes that may be used with the present invention is describes in previously incorporated U.S. Pat. No. 6,264,561.

A device 1506 that monitors a plurality of gaming devices to determine adherence of the devices to gaming jurisdictional rules 1508 may be included in the system 1500. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 1500 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 1516 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in the present inventions, network efficient devices 1510 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 1512. For example, a software licensing billing server may generate a bill for a gaming device operator based upon a usage of games over a time period on the gaming devices owned by the operator. In another example, a software auditing server may provide reports on game software downloads to various gaming devices in the gaming system 1500 and current configurations of the game software on these gaming devices.

At particular time intervals, the software auditing server 1512 may also request software configurations from a number of gaming devices in the gaming system. The server may then reconcile the software configuration on each gaming device. In one embodiment, the software auditing server 1512 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 15. Many of the interactions are coupled. For example, methods used for game licensing may affect methods used for game downloading and vice versa. For the purposes of explanation, details of a few possible interactions between the components of the system 1500 relating to software licensing and software downloads have been described. The descriptions are selected to illustrate particular interactions in the game system 1500. These descriptions are provided for the purposes of explanation only and are not intended to limit the scope of the present invention.

Gaming System Configuration

In one embodiment, as described above, the present invention may be implemented in various configurations for gaming machines, including but not limited to: (1) a dedicated gaming machine, wherein the computerized instructions for controlling any games (which are provided by the gaming machine) are provided with the gaming machine prior to delivery to a gaming establishment; and (2) a changeable gaming machine, where the computerized instructions for controlling any games (which are provided by the gaming machine) are downloadable to the gaming machine through a data network when the gaming machine is in a gaming establishment. In another embodiment, the computerized instructions for controlling any games are communicated from the remote host, the central server or central controller to a gaming machine local processor and memory devices. In such a "thick client" embodiment, the gaming machine local processor executes the communicated computerized instructions to control any games (or other suitable interfaces) provided to a player.

In one alternative embodiment, the computerized instructions for controlling any games are executed by a remote host, a central server or central controller. In such a "thin client" embodiment, the remote host remotely controls any games (or other suitable interfaces) and the gaming machine is utilized to display such games (or suitable interfaces) and receive one or more inputs or commands from a player. In one embodiment, one or more gaming machines in a gaming system may be thin client gaming machines and one or more gaming machines in the gaming system may be thick client gaming machines. In another embodiment, certain functions of the gaming machine are implemented in a thin client environment and certain other functions of the gaming machine are implemented in a thick client environment. In one such embodiment, computerized instructions for controlling any primary games are communicated from the remote host to the gaming machine in a thick client configuration and computerized instructions for controlling any secondary games or bonus functions are executed by a remote host in a thin client configuration. It should be appreciated that one, more or each of the functions of the remote host as disclosed herein may be performed by one or more gaming machine processors. It should be further appreciated that one, more or each of the functions of one or more gaming machine processors as disclosed herein may be performed by the remote host.

In one embodiment, the gaming machine randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In an alternative embodiment, the remote host maintains one or more predetermined pools or sets of predetermined game outcomes. In this embodiment, the remote host receives the game outcome request and independently selects a predetermined game outcome from a set or pool of game outcomes. The remote host flags or marks the selected game outcome as used. Once a game outcome is flagged as used, it is prevented from further selection from the set or pool and cannot be selected by the remote host upon another wager. The provided game outcome can include a primary game outcome, a secondary game outcome, primary and secondary game outcomes, or a series of game outcomes such as free games.

The remote host communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the remote host and communicated to the initiated gaming machine to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming machines based on the results of a bingo, keno or lottery game. In this embodiment, each individual gaming machine utilizes one or more bingo, keno or lottery games to determine the predetermined game outcome value provided to the player for the interactive game played at that gaming machine. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming machine is enrolled in the bingo game, such as upon an appropriate wager or engaging an input device, the enrolled gaming machine is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing or associating a different bingo card to each of a plurality of enrolled gaming machines, the remote host randomly selects or draws, one at a time, a plurality of the elements. As each element is selected, a determination is made for each gaming machine as to whether the selected element is present on the bingo card provided to that enrolled gaming machine. This determination can be made by the remote host, the gaming machine, a combination of the two, or in any other suitable manner. If the selected element is present on the bingo card provided to that enrolled gaming machine, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming machine requires the player to engage a daub button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome determined for each gaming machine enrolled in the bingo game is utilized by that gaming machine to determine the predetermined game outcome provided to the player. For example, a first gaming machine to have selected elements marked in a predetermined pattern is provided a first outcome of win $10 which will be provided to a first player regardless of how the first player plays in a first game and a second gaming machine to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above.

In another embodiment, the game outcome provided to the player is determined by a remote host and provided to the player at the gaming machine. In this embodiment, each of a plurality of such gaming machines are in communication with the remote host. Upon a player initiating game play at one of the gaming machines, the initiated gaming machine communicates a game outcome request to the remote host. In one embodiment, the remote host receives the game outcome request and randomly generates a game outcome for the primary game based on probability data. In another embodiment, the remote host randomly generates a game outcome for the secondary game based on probability data. In another embodiment, the remote host randomly generates a game outcome for both the primary game and the secondary game based on probability data. In this embodiment, the remote host is capable of storing and utilizing program code or other data similar to the processor and memory device of the gaming machine.

In another embodiment, one or more of the gaming machines are in communication with a remote host for monitoring purposes. In one embodiment, the gaming network includes a real-time or on-line accounting and gaming information system operably coupled to the remote host. The accounting and gaming information system of this embodiment includes a player database for storing player profiles, a player tracking module for tracking players and a credit system for providing automated casino transactions.

In another embodiment, a plurality of gaming machines at one or more gaming sites may be networked to the remote host in a progressive configuration, as known in the art, wherein a portion of each wager to initiate a base or primary game may be allocated to one or more progressive awards. In one embodiment, a progressive gaming system host site computer is coupled to a plurality of the remote hosts at a variety of mutually remote gaming sites for providing a multi-site linked progressive automated gaming system. In one embodiment, a progressive gaming system host site computer may serve gaming machines distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each remote host computer is responsible for all data communication between the gaming machine hardware and software and the progressive gaming system host site computer. In one embodiment, an individual gaming machine may trigger a progressive award win. In another embodiment, a remote host (or the progressive gaming system host site computer) determines when a progressive award win is triggered. In another embodiment, an individual gaming machine and a remote host (or progressive gaming system host site computer) work in conjunction with each other to determine when a progressive win is triggered, for example through an individual gaming machine meeting a predetermined requirement established by the remote host.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming machine is randomly or apparently randomly selected to provide a player of that gaming machine one or more progressive awards. In one such embodiment, the gaming machine does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, the gaming system maintains at least one progressive award by allocating a percentage of a player's wager into the player's own progressive award or pool (i.e., a personal progressive award). In this embodiment, upon the occurrence of an event (either associated with game play or independent of game play), the gaming system provides the player their personal progressive award.

In another embodiment, a plurality of players at a plurality of linked gaming machines in a gaming system participate in a group gaming environment. In one embodiment, a plurality of players at a plurality of linked gaming machines work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming machines compete against one another for one or more awards. In one such embodiment, a plurality of players at a plurality of linked gaming machines participate in a gaming tournament for one or more awards. In another embodiment, a plurality of players at a plurality of linked gaming machines play for one or more awards wherein an outcome generated by one gaming machine affects the outcomes generated by one or more linked gaming machines.

Some networks described herein provide methods and devices for managing one or more networked gaming establishments. Such networks may sometimes be referred to herein as server-based gaming networks, sb™ networks, or the like. Some such gaming networks described herein allow for the convenient provisioning of networked gaming machines and other devices relevant to casino operations. Game themes may be easily and conveniently added or changed, if desired. Related software, including but not limited to player tracking software, peripheral software, etc., may be downloaded to networked gaming machines, mobile gaming devices, thin clients and/or other devices, such as kiosks, networked gaming tables, player stations, etc.

In some implementations, servers or other devices of a central system will determine game outcomes and/or provide other wager gaming functionality. In some such implementations, wagering games may be executed primarily on one or more devices of a central system, such as a server, a host computer, etc. For example, wager gaming determinations (such as interim and final game outcomes, bonuses, etc.) may be made by one or more servers or other networked devices. Player tracking functions, accounting functions and even some display-related functions associated with wagering games may be performed, at least in part, by one or more devices of casino network and/or of a central system.

Figure 16:
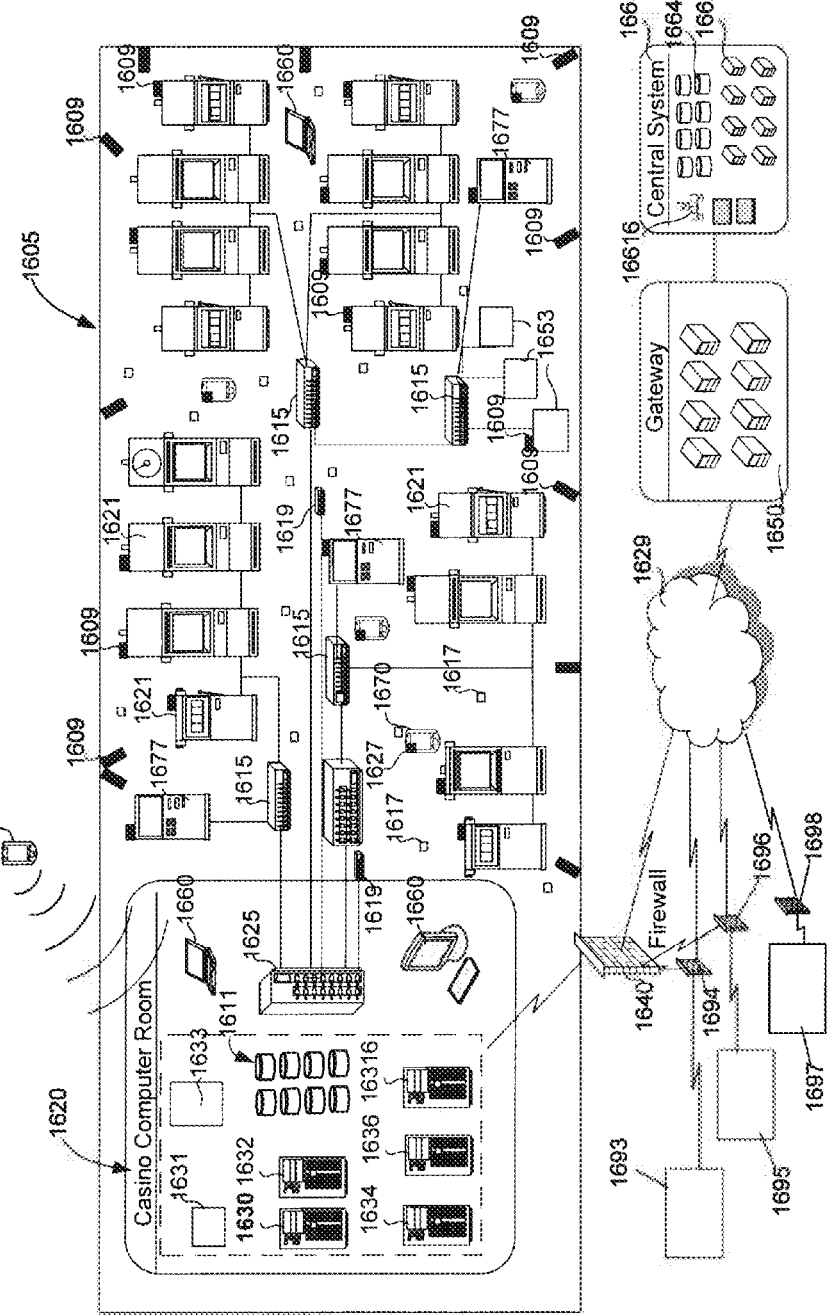
FIG. 16 shows a server-based gaming network, which may be used for implementing one or more embodiments of the present invention.

FIG. 16 shows a server-based (sb™) gaming network, which may be used for implementing one or more embodiments of the present invention. Those of skill in the art will realize that this architecture and the related functionality are merely examples and that the present invention encompasses many other such embodiments and methods.

Here, casino computer room 1620 and networked devices of a gaming establishment 1605 are illustrated. Gaming establishment 1605 is configured for communication with central system 1663 via gateway 1650. Gaming establishments 1693 and 1695 are also configured for communication with central system 1663.

In some implementations, gaming establishments may be configured for communication with one another. In this example, gaming establishments 1693 and 1695 are configured for communication with casino computer room 1620. Such a configuration may allow devices and/or operators in casino 1605 to communicate with and/or control devices in other casinos. In some such implementations, a server in computer room 1620 may control devices in casino 1605 and devices in other gaming establishments. Conversely, devices and/or operators in another gaming establishment may communicate with and/or control devices in casino 1605.

For example, a server of casino 1605 or central system 1663 may be provisioned with relatively more advanced software (e.g., 3-D facial recognition software) for patron identification than servers of other networked locations. Such a server may process patron identification requests from devices in casino 1605 as well as patron identification requests from devices in gaming establishments 1693 and 1695.

Here, gaming establishment 1697 is configured for communication with central system 1663, but is not configured for communication with other gaming establishments. Some gaming establishments (not shown) may not be in communication with other gaming establishments or with a central system. Gaming establishment 1605 includes multiple gaming machines 1621, each of which is part of a bank 1610 of gaming machines 1621. In this example, gaming establishment 1605 also includes a bank of networked gaming tables 1653. However, the present invention may be implemented in gaming establishments having any number of gaming machines, gaming tables, etc. It will be appreciated that many gaming establishments include hundreds or even thousands of gaming machines 1621 and/or gaming tables 1653, not all of which are necessarily included in a bank and some of which may not be connected to a network. At least some of gaming machines 1621 and/or mobile devices 1670 may be "thin clients" that are configured to perform client-side methods as described elsewhere herein.

Some gaming networks provide features for gaming tables that are similar to those provided for gaming machines, including but not limited to bonusing, player loyalty/player tracking and the use of cashless instruments. Relevant material is provided in U.S. patent application Ser. No. 11/154,1633, entitled "CASHLESS INSTRUMENT BASED TABLE GAME PROMOTIONAL SYSTEM AND METHODOLOGY" and filed on Jun. 15, 2005, U.S. Provisional Patent Application No. 60/16,516,046, entitled "AUTOMATED PLAYER DATA COLLECTION SYSTEM FOR TABLE GAME ENVIRONMENTS" and filed on Nov. 10, 2006, U.S. patent application Ser. No. 11/129,702, entitled "WIDE AREA TABLE GAMING MONITOR AND CONTROL SYSTEM" and filed on May 15, 2005, U.S. patent application Ser. No. 11/425,9916 entitled "PROGRESSIVE TABLE GAME BONUSING SYSTEMS AND METHODS", filed Jun. 22, 2006 and U.S. patent application Ser. No. 11/225,299, entitled "UNIVERSAL CASINO BONUSING SYSTEMS AND METHODS" and filed on Sep. 12, 2005, all of which are incorporated herein by reference. Accordingly, software related to such features may be provided and/or controlled, and related data may be obtained and/or provided, according to the present invention.

Some configurations can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 1653 may be configured for communication with individual player terminals (not shown), which may be configured to accept bets, present an electronic representation of a dealer, indicate game outcomes, etc.

Some gaming networks include electronically configurable tables for playing table games. U.S. patent application Ser. No. 11/517,1661, entitled "CASINO DISPLAY METHODS AND DEVICES" and filed on Sep. 7, 2006, describes some such tables and is hereby incorporated by reference. An operator may select a desired game, such as a poker game or a blackjack game, and the table will be automatically configured with geometrical patterns, text, etc., which are appropriate for the desired table game. The desired type of table game may be selected by a control on the table itself or according to instructions received from, e.g., a server or a casino manager via a network interface.

Gaming establishment 1605 also includes networked kiosks 1677. Depending on the implementation, kiosks 1677 may be used for various purposes, including but not limited to cashing out, prize redemption, redeeming points from a player loyalty program, redeeming "cashless" indicia such as bonus tickets, smart cards, etc. In some implementations, kiosks 1677 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present invention. For example, in some implementations of the invention, kiosks 1677 may be configured to receive information from a patron, e.g., by presenting graphical user interfaces.

In this example, each bank 1610 has a corresponding switch 1615, which may be a conventional bank switch in some implementations. Each switch 1615 is configured for communication with one or more devices in computer room 1620 via main network device 1625, which combines switching and routing functionality in this example. Although various communication protocols may be used, some preferred implementations use the Gaming Standards Association's G2S Message Protocol. Other implementations may use IGT's open, Ethernet-based SuperSAS® protocol, which IGT makes available for downloading without charge. Still other protocols, including but not limited to Best of Breed ("BOB"), may be used to implement various embodiments of the invention. IGT has also developed a gaming-industry-specific transport layer called CASH that rides on top of TCP/IP and offers additional functionality and security.

Here, gaming establishment 1605 also includes an RFID network, implemented in part by RFID switches 1619 and multiple RFID readers 1617. An RFID network may be used, for example, to track objects (such as mobile gaming devices 1670, which include RFID tags 1627 in this example), patrons, etc., in the vicinity of gaming establishment 1605. Some examples of how an RFID network may be used in a gaming establishment are set forth in U.S. patent application Ser. No. 11/655,496, entitled "DYNAMIC CASINO TRACKING AND OPTIMIZATION" and filed on Jan. 19, 2007 and in U.S. patent application Ser. No. 11/599,241, entitled "DOWNLOADING UPON THE OCCURRENCE OF PREDETERMINED EVENTS" and filed on Nov. 13, 2006, all of which are hereby incorporated by reference.

As noted elsewhere herein, some implementations of the invention may involve "smart" player loyalty instruments, such as player tracking cards, which include an RFID tag. Accordingly, the location of such RFID-enabled player loyalty instruments may be tracked via the RFID network. In this example, at least some of mobile devices 1670 may include an RFID tag 1627, which includes encoded identification information for the mobile device 1670. Accordingly, the locations of such tagged mobile devices 1670 may be tracked via the RFID network in gaming establishment 1605. Other location-detection devices and systems, such as the global positioning system ("GPS"), may be used to monitor the location of people and/or devices in the vicinity of gaming establishment 1605 or elsewhere.

Various alternative network topologies can be used to implement different embodiments of the invention and/or to accommodate varying numbers of networked devices. For example, gaming establishments with large numbers of gaming machines may require multiple instances of some network devices (e.g., of main network device 1625, which combines switching and routing functionality in this example) and/or the inclusion of other network devices not shown in FIG. 16. Some implementations of the invention may include one or more middleware servers disposed between kiosks 1677, RFID switches 1619 and/or bank switches 1615 and one or more devices in computer room 1620 (e.g., a corresponding server). Such middleware servers can provide various useful functions, including but not limited to the filtering and/or aggregation of data received from switches, from individual gaming machines and from other devices. Some implementations of the invention include load-balancing methods and devices for managing network traffic.

Storage devices 1611, sb™ server 1630, License Manager 1631, Arbiter 1633, servers 1632, 1634, 1636 and 16316, host device(s) 1660 and main network device 1625 are disposed within computer room 1620 of gaming establishment 1605. In practice, more or fewer devices may be used. Depending on the implementation, some such devices may reside in gaming establishment 1605 or elsewhere.

One or more devices in central system 1663 may also be configured to perform, at least in part, tasks specific to the present invention. For example, one or more servers 1662, arbiter 1633, storage devices 1664 and/or host devices 1660 of central system 1663 may be configured to implement the functions described in detail elsewhere herein. These functions may include, but are not limited to, providing functionality for devices such as wager gaming machines 1621, mobile devices 1670, etc.

One or more of the servers of computer room 1620 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from cameras 1609, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of computer room 1620 to mobile devices 1670. Some implementations of the present invention include a plurality of networked cameras 1609, which may be video cameras, smart cameras, digital still cameras, etc. In some such implementations, such cameras may provide, at least in part, real-time navigation features such as those described in U.S. patent application Ser. No. 12/106,771, entitled "Real-Time Navigation Devices, Systems and Methods," which is incorporated herein by reference.

Other devices that may be deployed in network 1605 do not appear in FIG. 16. For example, some gaming networks may include not only various radio frequency identification ("RFID") readers 1617, but also RFID switches, middleware servers, etc., some of which are not depicted in FIG. 16. These features may provide various functions. For example, a server (or another device) may determine a location of a mobile device 1670 according to the location of an RFID reader that reads an RFID tag 1627.

The servers and other devices indicated in FIG. 16 may be configured for communication with other devices in or outside of gaming establishment 1605, such as host devices 1660, kiosks 1677 and/or mobile devices 1670, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the invention provide one or more of these servers in the form of blade servers.

Some preferred embodiments of sb™ server 1630 and the other servers shown in FIG. 16 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations of the invention, many of these devices (including but not limited to License Manager 1631, servers 1632, 1634, 1636 and 16316, and main network device 1625) are mounted in a single rack with sb™ server 1630. Accordingly, many or all such devices will sometimes be referenced in the aggregate as an "sb™ server." However, in alternative implementations, one or more of these devices is in communication with sb™ server 1630 and/or other devices of the network but located elsewhere. For example, some of the devices could be mounted in separate racks within computer room 1620 or located elsewhere on the network. Moreover, it can be advantageous to store large volumes of data elsewhere via a storage area network ("SAN").

Computer room 1620 may include one or more operator consoles or other host devices that are configured for communication with other devices within and outside of computer room 1620. Such host devices may be provided with software, hardware and/or firmware for implementing various embodiments of the invention. However, such host devices need not be located within computer room 1620. Wired host devices 1660 (which are desktop and laptop computers in this example) and wireless devices 1670 (which are PDAs in this example) may be located elsewhere in gaming establishment 1605 or at a remote location.

Although the foregoing present invention has been described in detail by way of illustration and example for purposes of clarity and understanding, it will be recognized that the above described present invention may be embodied in numerous other specific variations and embodiments without departing from the spirit or essential characteristics of the present invention. Certain changes and modifications may be practiced, and it is understood that the present invention is not to be limited by the foregoing details, but rather is to be defined by the scope of the appended claims.

What is claimed is:

1. A method for performing cashless wager-based gaming on a wager-based gaming machine, the method comprising:
    storing, in a first memory device on the wager-based gaming machine, a first credit balance representing a first amount of credit available for wagering to play one or more games of chance available on the wager-based gaming machine;
    receiving by a secure transaction module of the wager-based gaming machine from a processor of the wager-based gaming machine a first request, the first request representing a request to update a second credit balance stored on a portable electronic device in communication with the wager-based gaming machine, the second credit balance representing a second amount of credit available on the portable electronic device, the second credit balance being one of a number of different credit types;
    transmitting from the secure transaction module of the wager-based gaming machine, via a communication interface, the first request to the portable electronic device in communication with the wager-based gaming machine, the first request including security authorization information;
    receiving, by a security module of the portable electronic device, the first request from the secure transaction module of the wager-based gaming machine via the communication interface;
    determining, by the security module of the portable electronic device, whether the first request complies with one or more security authorization requirements, the determination including a determination whether the secure transaction module of the wager-based gaming machine is authorized to make the first request to update the second credit balance stored on the portable electronic device based on the credit type of the second credit balance;
    updating, by the security module of the portable electronic device, the second amount of credit in accordance with the first request in response to the determination that the first request complies with the one or more security authorization requirements including that the secure transaction module of the wager-based gaming machine is authorized to make the first request;
    transmitting, from the portable electronic device to the secure transaction module of the wager-based gaming machine, a confirmation indication that the second amount of credit has been updated by the portable electronic device in accordance with the first request via the communication interface; and
    updating, by the secure transaction module of the wager-based gaming machine, the first credit balance stored in the first memory device in accordance with the first request in response to receiving the confirmation indication.

2. The method of claim 1, wherein the first request further includes a request to transfer a designated credit amount from the portable electronic device to the wager-based gaming machine.

3. The method of claim 2, wherein the first request is transmitted responsive to a determination that the first credit balance has reached a first credit threshold.

4. The method of claim 3, the method further comprising:
    determining, by a processor of the secure transaction module of the wager-based gaming machine, the designated credit amount based on a predetermined auto-transfer amount and the first credit threshold.

5. The method of claim 3, wherein the first request is transmitted in response to a request received from a user of the wager-based gaming machine.

6. The method of claim 1, wherein the first request further includes a request to transfer a designated credit amount from the wager-based gaming machine to the portable electronic device.

7. The method of claim 6, the method further comprising:
    determining, by the secure transaction module of the wager-based gaming machine, in response to receiving a request to cash out, whether the communication interface is in communication with the portable electronic device;
    transferring, in response to a determination that the communication interface is not in communication with the portable electronic device, the first credit balance from the first memory device to a second memory device of the secure transaction module of the wager-based gaming machine;
    transmitting a request, from the secure transaction module of the wager-based gaming machine to a master gaming controller of the wager-based gaming machine, indicating that the wager-based gaming machine should be temporarily placed in an out-of-service state; and
    transmitting a request, from the secure transaction module of the wager-based gaming machine to the master gaming controller, to perform a no-card cash out operation to communicate with a new portable electronic device via the communication interface.

8. The method of claim 1, the method further comprising:
    determining, by the secure transaction module of the wager-based gaming machine, a first offline window for the portable electronic device, the first offline window representing a time period in which the portable electronic device may be used for cashless gaming without authenticating with one or more cashless gaming servers;

determining, by the secure transaction module of the wager-based gaming machine, a first on-line use of the portable electronic device, the first on-line use corresponding to a most recent time in which the portable electronic device was authenticated with the one or more cashless gaming servers;

determining, by the secure transaction module of the wager-based gaming machine, whether the first offline use is within the first offline window based on the first offline window and the first offline use; and permitting, by the secure transaction module of the wager-based gaming machine, use of the portable electronic device without the portable electronic device authenticating with the one or more cashless gaming servers when the first offline use is within the first offline window.

9. The method of claim 1, the method further comprising:
receiving from the portable electronic device, via the communication interface, identification information associated with the portable electronic device;
transmitting, to a cashless gaming server, a first message including the received identification information;
receiving, from the cashless gaming server, a second message including an indication that the portable electronic device has been blocked; and
outputting a notification that further use of the portable electronic device has been at least partially blocked.

10. The method of claim 1, wherein the credit type of the second credit balance is at least one of: a gambling balance, a non-gambling balance, promotional dollars, loyalty points, and player tracking points.

11. A system for cashless gaming, the system comprising:
a wager-based gaming machine configured to present one or more games of chance, the wager-based gaming machine comprising:
a master gaming controller,
a wager input device configured to receive an indication of a wager to play the one or more games of chance,
a value output device configured to output an indication of value including an award based on play of the one or more games of chance,
a first memory device configured to store a first credit balance representing a first amount of credit available for wagering to play the one or more games of chance controlled by the master gaming controller,
one or more communication interfaces, and
a secure transaction module;
a portable electronic device in communication with the wager-based gaming machine via the one or more communication interfaces, the portable electronic device comprising:
a first processor,
a second memory device configured to store a second credit balance representing a second amount of credit available on the portable electronic device, the second credit balance being one of a number of different credit types, and
a security module configured to:
receive from the secure transaction module of the wager-based gaming machine a first request via the one or more communication interfaces, the first request representing a request to update the second credit balance and the first request including security authorization information,
determine whether the first request complies with one or more security authorization requirements, the determination including a determination whether the secure transaction module of the wager-based gaming machine is authorized to make the first request to update the second credit balance stored on the portable electronic device based on the credit type of the second credit balance,
update the second amount of credit in accordance with the first request in response to the determination that the first request complies with the one or more security authorization requirements including that the secure transaction module of the wager-based gaming machine is authorized to make the first request,
transmit to the secure transaction module of the wager-based gaming machine a confirmation indication that the second amount of credit has been updated by the portable electronic device in accordance with the first request via the one or more communication interfaces; and
the secure transaction module of the wager-based gaming machine including a third memory device and a second processor, the second processor configured to:
update the first credit balance stored in the first memory device in accordance with the first request in response to receiving the confirmation indication.

12. The system of claim 11, wherein the first request further includes a request to transfer a designated credit amount from the portable electronic device to the wager-based gaming machine.

13. The system of claim 12, wherein the first request is transmitted responsive to a determination that the first credit balance has reached a first credit threshold.

14. The system of claim 13, wherein the second processor of the secure transaction module of the wager-based gaming machine is further configured to determine, using a predetermined auto-transfer amount and the first credit threshold, the designated credit amount.

15. The system of claim 12, wherein the first request is transmitted responsive to a request received from a user of the wager-based gaming machine.

16. The system of claim 11, wherein the first request further includes a request to transfer a first credit amount from the wager-based gaming machine to the portable electronic device.

17. The system of claim 15,
wherein the wager-based gaming machine is configured to place itself in an out-of-service state in response to a request received from the secure transaction module of the wager-based gaming machine; and
wherein the second processor of the secure transaction module of the wager-based gaming machine is further operable to:
determine, in response to a request to cash out, whether the one or more communication interfaces are in communication with the portable electronic device;
transfer, in response to a determination that the one or more communication interfaces are not in communication with the portable electronic device, the first credit balance from the first memory device to the third memory device;
transmit a request to the master gaming controller, the request indicating that the wager-based gaming machine should be temporarily placed in the out-of-service state; and
transmit a request to perform a no-card cash out operation to communicate with a new portable electronic device via the one or more communication interfaces.

18. The system of claim 11, wherein the second processor of the secure transaction module of the wager-based gaming machine is further configured to:
- determine a first offline window for the portable electronic device, the first offline window representing a time period in which the portable electronic device may be used for cashless gaming without authenticating with one or more cashless gaming servers;
- determine a first on-line use of the portable electronic device, the first on-line use corresponding to a most recent time in which the portable electronic device was authenticated with the one or more cashless gaming servers;
- determine, using the first offline window and the first offline use, whether the first offline use is within the first offline window; and
- permit, when the first offline use is within the first offline window, use of the portable electronic device without the portable electronic device authenticating with the one or more cashless gaming servers.

19. The system of claim 11, wherein the second processor of the secure transaction module of the wager-based gaming machine is further configured to:
- receive from the portable electronic device, via the one or more communication interfaces, identification information associated with the portable electronic device;
- transmit, to a cashless gaming server, a first message including the received identification information;
- receive, from the cashless gaming server, a second message including an indication that the portable electronic device has been blocked; and
- output a notification that further use of the portable electronic device has been at least partially blocked.

* * * * *